(12) United States Patent
Roberts et al.

(10) Patent No.: US 9,903,526 B2
(45) Date of Patent: Feb. 27, 2018

(54) SYSTEM AND METHOD FOR AN AUTOMATICALLY ADJUSTING FORCE ENGINE AND ASSISTED STORAGE

(75) Inventors: Jonathan Roberts, Frisco, TX (US); Clark Davis, Genola, UT (US); Ian Davis, Genola, UT (US); Jonathan George, Roy, UT (US)

(73) Assignee: Jonathan C. Roberts, West Des Moines, IA (US)

( * ) Notice: Subject to any disclaimer, the term of this patent is extended or adjusted under 35 U.S.C. 154(b) by 0 days.

(21) Appl. No.: 13/098,155

(22) Filed: Apr. 29, 2011

(65) Prior Publication Data

US 2011/0266937 A1    Nov. 3, 2011

Related U.S. Application Data

(60) Provisional application No. 61/330,797, filed on May 3, 2010, provisional application No. 61/473,623, filed on Apr. 8, 2011.

(51) Int. Cl.

| | |
|---|---|
| *F16M 11/18* | (2006.01) |
| *A47B 51/00* | (2006.01) |
| *F16M 11/04* | (2006.01) |

(52) U.S. Cl.
CPC ............. *F16M 11/18* (2013.01); *A47B 51/00* (2013.01); *F16M 11/046* (2013.01);
(Continued)

(58) Field of Classification Search
CPC .... A47B 51/00; F16M 11/046; F16M 11/048; F16M 11/18; F16M 2200/061;
(Continued)

(56) References Cited

U.S. PATENT DOCUMENTS

| 1,090,697 A | 3/1914 | Eddelman |
| 2,545,515 A | 3/1951 | Gannett et al. |

(Continued)

FOREIGN PATENT DOCUMENTS

| DE | 4335151 A1 * | 4/1995 | ............. B64D 11/00 |
| DE | 4446772 C1 * | 5/1996 | ............. B64D 11/00 |
| DE | 19617657 A1 * | 11/1997 | ............. B64D 11/00 |

OTHER PUBLICATIONS

DE19617657A1 Translation.pdf, 31 pages.*
(Continued)

*Primary Examiner* — Andrew M Roersma
(74) *Attorney, Agent, or Firm* — Goodhue, Coleman & Owens, P.C.

(57) ABSTRACT

A force engine operable to counterbalance a load. The force engine includes one or more energy reservoirs operable to store energy. The one or more energy reservoirs are operable to generate a force to balance the load through the displacement in an operating mode. A traveling member is hingedly connected to the one or more energy reservoirs. The force generated by the one or more energy reservoirs is transferred to the load through the traveling member and an associated linkage. A variable member is coupled to the one or more energy reservoirs. In the adjusting mode the variable member is displaced to configure an operating relationship between the one or more energy reservoirs and the traveling member. A release interacts with the variable member to fix a position of the variable member.

1 Claim, 23 Drawing Sheets

(52) U.S. Cl.
CPC ..... *F16M 11/048* (2013.01); *F16M 2200/041* (2013.01); *F16M 2200/061* (2013.01); *F16M 2200/063* (2013.01); *Y10T 16/82* (2015.01); *Y10T 16/84* (2015.01)

(58) Field of Classification Search
CPC ........ F16M 2200/063; F16M 2200/041; Y10T 16/82; Y10T 16/84; E05F 1/1091; E05F 2201/416; E05F 2201/618; E05F 2400/44; E05F 2600/11; E05F 2900/502; E05F 2900/538; Y02T 50/46; B64D 11/003
USPC ....... 248/566, 571, 572, 560, 573, 636, 610, 248/585–588; 188/284, 285, 312, 321.11, 188/322.22, 282.9; 267/175, 34; 312/248, 247, 325, 319.2, 319.3; 52/29, 52/64; 74/469
See application file for complete search history.

(56) References Cited

U.S. PATENT DOCUMENTS

| | | | |
|---|---|---|---|
| 2,910,335 A | | 10/1959 | Wales |
| 3,172,632 A | | 3/1965 | Borg |
| 3,901,464 A | * | 8/1975 | Arnstein et al. ................ 244/46 |
| 4,076,351 A | * | 2/1978 | Wyant ........................... 312/247 |
| 4,813,064 A | * | 3/1989 | Jackson et al. ............... 378/197 |
| 4,883,249 A | | 11/1989 | Garland |
| 5,058,846 A | * | 10/1991 | Close ......................... 248/284.1 |
| 5,224,677 A | * | 7/1993 | Close .................... A47F 5/0087 211/104 |
| 5,228,763 A | * | 7/1993 | Gingold ............... A47B 46/005 312/247 |
| 5,244,269 A | * | 9/1993 | Harriehausen et al. ...... 312/247 |
| 5,758,782 A | * | 6/1998 | Rupert ................... A47B 46/00 211/104 |
| 5,857,756 A | * | 1/1999 | Fehre ................... A47B 46/005 312/246 |
| 6,883,753 B1 | * | 4/2005 | Scown ................. B64D 11/003 244/118.1 |
| 7,090,314 B2 | * | 8/2006 | Burrows et al. .............. 312/246 |
| 7,118,068 B2 | * | 10/2006 | Graf et al. .................. 244/118.5 |
| 7,143,977 B2 | * | 12/2006 | Graf et al. .................. 244/118.1 |
| 7,258,406 B2 | * | 8/2007 | Stephan et al. ............... 312/246 |
| 7,428,855 B2 | * | 9/2008 | Duval ............................. 74/516 |
| 7,481,397 B2 | * | 1/2009 | Steinbeck et al. ......... 244/118.5 |
| 2008/0277552 A1 | | 11/2008 | Duvall |

OTHER PUBLICATIONS

International Searching Authority: Notification of Transmittal of the International Search Report and the Written Opinion of the International Searching Authority, or the Declaration dated Dec. 19, 2011.

International Searching Authority: International Search Report dated Dec. 19, 2011.

International Searching Authority: Written Opinion of the International Searching Authority dated Dec. 19, 2011.

\* cited by examiner

1300

1200

FIG. 19
1902
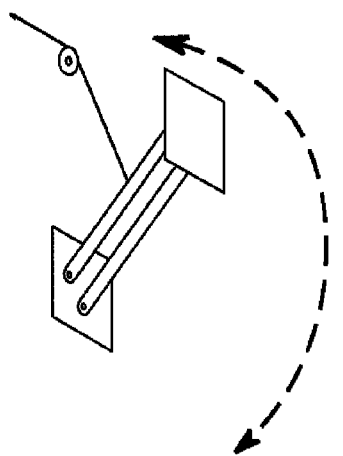
1904
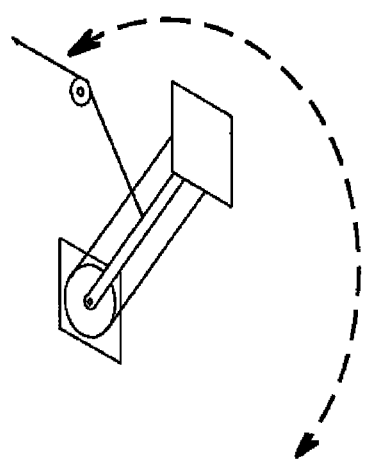
1906
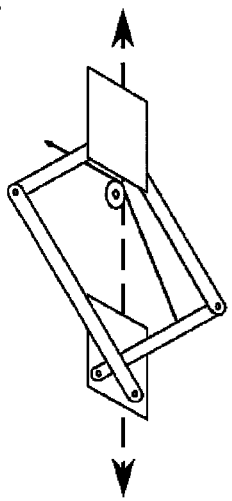
1908
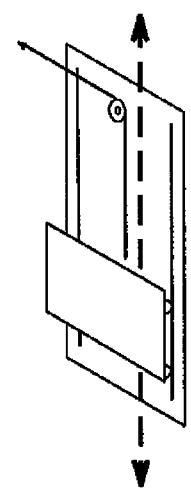
1910
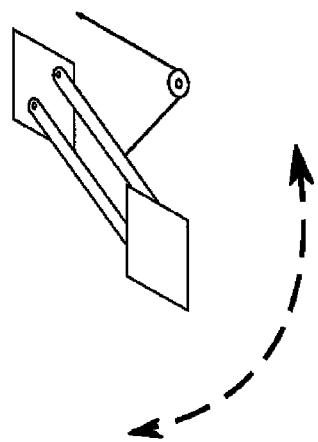

SYSTEM AND METHOD FOR AN AUTOMATICALLY ADJUSTING FORCE ENGINE AND ASSISTED STORAGE

RELATED APPLICATION DATA

This patent application claims benefit and priority from U.S. provisional application No. 61/330,797 filed May 3, 2010 and U.S. provisional application No. 61/473,623 filed Apr. 8, 2011 both of which are hereby incorporated by reference in their entireties.

BACKGROUND

Counter balance systems may provide a method for compensating for a load. Existing counter balance engine and systems may be constrained by their respective designs to small loads, limited motion, complex load adjustments, or may have other functional issues. In many cases, counterbalancing systems are not easily utilized or integrated with devices, systems, furniture, or other elements because of their size, shape, and complexity.

For example, counterbalance systems have not been effectively utilized in storage systems. In particular, many simple and complex forms of vertical storage, including overhead storage, are inconvenient or difficult to access. For example, many individuals, such as children, elderly individuals, disabled parties, and those that are vertically challenged may have some difficulty accessing cabinets, shelves, or other storage elements within a home, commercial facility, or other structure. Likewise, bending over to access stored goods may be equally difficult for other individuals. As a result, it may be difficult to utilize vertical storage space effectively while still providing users full and uninhibited access to the stored goods.

In many cases, the cited prior art has undesirable limitations. In particular, existing systems have been limited to very specific solutions and are not optimized for performing automatic balancing for a load. Existing systems without automatic adjustments and optimized transformations of a balancing force are shown in U.S. Pat. No. 7,798,035 to Duval and U.S. patent application Ser. No. 12/052,155 to Van Dorsser. In many cases, the existing systems are also not adaptable to different applications, environments, and user needs. For example, a single type of energy storage device, such as a coil spring may be utilized or required and a path of a carriage may be limited reducing adaptability. A system that may require an extremely strong spring and supporting linkages with a limited force generation capacity and displacement is shown in U.S. Pat. No. 2,910,335 to Wales. Another existing system may require a zero free length spring, significant load displacement, and changes to the energy state of the spring to adjust to a load as is described in U.S. Pat. No. 4,387,876 to Nathan. Other aircraft specific solutions may tilt the load during displacement, provide limited displacement paths, and utilize force engine and linkage configurations that may be complex or cumbersome, such as U.S. Pat. No. 5,244,269 to Harriehausen and U.S. Pat. No. 7,481,397 to Steinbeck.

Illustrative embodiments of the present invention provides a force engine and counterbalancing system that automatically adapts to changing loads while optimizing and enhancing the magnitude, path, orientation, and displacement of the load and the systems and methods for driving the load. In addition, the systems, methods, and components described in the illustrative embodiments may be interchangeable and customized for numerous applications and required functionality thereby providing flexibility in configuring and transferring forces to meet needs of the user.

The additional use of kinematic transformations at multiple positions within the force engine and storage system and positioning of the force engine and lift arms improves the flexibility in designing systems that achieve desirable results.

SUMMARY

A force engine operable to counterbalance a load. The force engine may include one or more energy reservoirs operable to store energy associated with a displacement of the one or more reservoirs. The one or more energy reservoirs may be operable to generate a force to balance the load through the displacement in an operating mode. The force engine may further include a traveling member hingedly connected to the one or more energy reservoirs. The force generated by the one or more energy reservoirs may be transferred to the load through the traveling member and an associated linkage. The force engine may further include a variable member coupled to the one or more energy reservoirs. In the adjusting mode the variable member may be displaced to configure the operating relationship between the one or more energy reservoirs and the traveling member utilized in the operating mode. Displacing the variable member may results in zero or minimal net change of an energy state of the one or more energy reservoirs. The force engine may further include a release interacting with the variable member. In the operating mode, the release may fix a position of the variable member in one of multiple positions. The release may be disengaged when the force engine transitions from the operating mode to the adjusting mode.

A storage system and method for using and manufacturing the storage system. The storage system may include a frame. The storage system may further include a force engine integrated with the frame. The storage system may further include a carriage connected to the frame by a linkage. The carriage may be driven through a path by the force engine. The force engine may operate in an operating mode and an adjusting mode. In an operating mode, the force engine may drive the carriage through a path with minimal user input. In the adjusting mode the force engine may automatically configures itself to provide the force to drive the load through the path in response to the minimal user input.

Another embodiment includes a method for storing goods. A carriage enabled to store the goods in response to a first user force is extended. A linkage connected between an energy reservoir and the carriage is automatically adjusted in an adjusting mode to configure a force countering a weight of the goods applied by the energy reservoir during an operating mode. The automatic adjusting may be performed in response to a change of the weight of the goods during an adjusting mode. The force may be applied to retract the carriage securing the goods in response to a second user force.

BRIEF DESCRIPTION OF THE DRAWINGS

Illustrative embodiments of the present invention are described in detail below with reference to the attached drawing figures, which are incorporated by reference herein and wherein:

FIG. 19 is a pictorial representation of lift arm systems for the auto-balancing cabinet in accordance with illustrative embodiments;

DETAILED DESCRIPTION OF THE DRAWINGS

Figure 1:
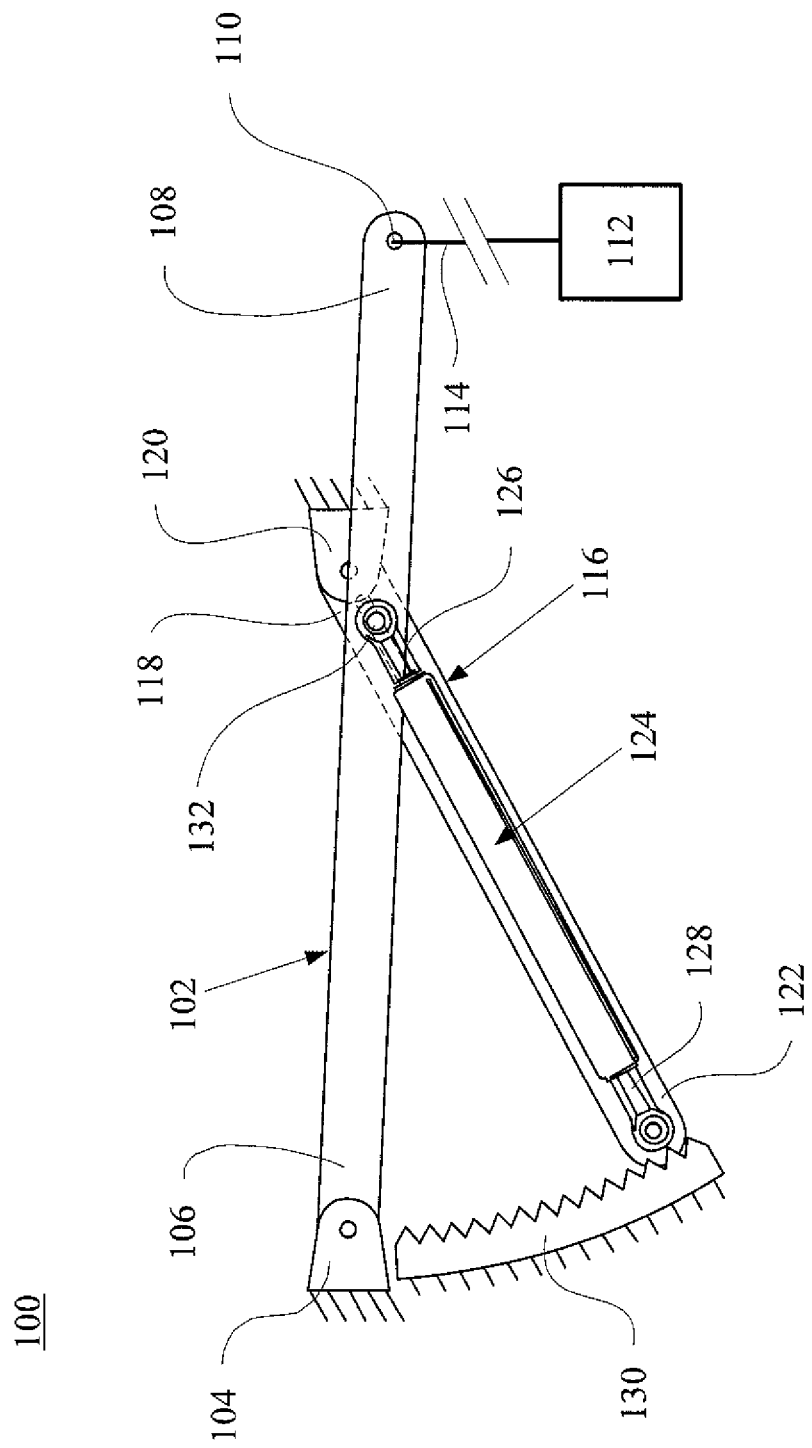
FIGS. 1-16 are pictorial representations of force engines in accordance with illustrative embodiments.

Illustrative embodiments provide an automatic adjusting force engine and a system and method for utilizing and incorporating the force engine. The force engine is an energy storage and generating system that provides a balancing force. The force engine may be utilized in any number of applications, and systems a few of which are described herein. In one embodiment, the force engine provides a counterbalancing force to a load. The counterbalancing force may be applied directly or indirectly. The force engine provides the force so the weight of the load may be moved with minimal user input or effort.

In various embodiments, the force engine may automatically adjust to the load with minimal user input. In other embodiments, the force engine may adjust based on a user initiating the adjustment or in response to the user performing the adjustment. Automatic adjustment may include configuring, reconfiguring, or otherwise adjusting the operating relationship and positioning of the energy reservoir, members, linkages, arms, and other components of the force engine to provide the balancing force.

The illustrative embodiments also provide an automatic counterbalancing system (or auto-balancing system). The automatic counterbalancing system may be utilized for assisted storage systems. In the automatic counterbalancing system, the load may include a force or weight of goods applied to the auto-balancing system. Goods or stored goods are defined to include household or business items, machinery, sporting and recreational equipment, or any other products or goods that a user may need to store or secure. For example, the assisted storage systems may utilize a force engine to drive motion of a cabinet, shelf, tool, or other carriage through a displacement path. The displacement path may be an out-and-down, down-and-out, direct drop, inclined drop, or other arched or curved path as described herein.

The automatic counterbalancing system may be particularly useful in storage applications, such as in garages, kitchens, closets, commercial offices, retail stores, warehouses, transportation craft (air, ground, rail or water), or in other structures or crafts. The automatic counterbalancing system may be attached to a wall, floor, or ceiling of the structure to ensure stability and for convenience. In automatic counterbalancing system may also be integrated with existing, cabinets, shelves, tools, furniture, or other structural components. The counterbalancing systems allow goods to be raised or lowered to an out of the way storage position.

The components and configurations of the described embodiments are interchangeable and not meant to be limiting, but rather are illustrative embodiments. Various illustrative embodiments of the force engine and counterbalance system may be configured utilizing a basic framework. For example, the described systems may utilize any number of energy reservoirs depending on the load requirements and selected linkages depending on a selected displacement path for the load. In particular, a variable load is moved through the same fixed displacement or output path. If the load is less than a maximum load, only a portion of the capacity of the energy reservoir is utilized.

The following provides a framework for understanding the embodiments and drawings relative to methodology, structure, and function. The framework may also explain the potential combinations and variations of the embodiments. In particular, the framework is applicable to the subsequently described force engines and counterbalance systems, such as an auto-balancing cabinet.

An energy reservoir may be utilized that is capable of storing mechanical potential energy which may be deployed to create a counterbalancing force. As is described herein, a variety of suitable energy reservoirs exists and may be effectively utilized. In one possible application, the counterbalance force may be utilized to lift a load from a loading/unloading height to a stored height during an operating mode. Potential energy is transferred from the energy reservoir to the load being lifted. The system is also capable of transferring potential energy lost from the load to the energy reservoir as the load is lowered from the stored height to the load/unload height. Energy is traded between the load and the energy reservoir as the load is raised and lowered.

Energy is transferred between the load and the energy reservoir through a linkage capable of transmitting forces between the energy reservoir and a carriage (storing the load), or other point to which the load may be attached. The linkage may be embodied in any number of ways. The energy reservoir is capable of storing enough energy to lift a maximum load over a set displacement or displacement path. The counterbalance system is capable of being reconfigured during an adjusting mode to adjust the amount of energy transferred from the energy reservoir to balance any load between a maximum and minimum load during the operating mode. The rate at which energy is transferred is variable. For example, when operating with a maximum load, the entire energy capacity of the energy reservoir is transferred as the load displaces through the displacement path. With a 50% load, only 50% of the energy will be transferred from the energy reservoir as the load is displaced over the same range of the displacement path. With a minimum load, only a minimal amount of energy is transferred from the energy reservoir as the load is displaced over the same range of the displacement path.

In these embodiments, the load is displaced over the same range of the displacement path, but the amount of energy transferred from the energy reservoir to the load varies. This may be accomplished by adjusting or reconfiguring the operating relationship of the linkage between the energy reservoir and the carriage in an adjusting mode. In particular, the operating relationship, kinematic relationship, or coupling ratio of the linkage is increased to accommodate heavier loads. The operating relationship is likewise decreased to accommodate lighter loads. An increased coupling ratio indicates that the energy reservoir will have a greater displacement for the same displacement of the carriage.

The adjustment of the operating relationship of the linkage may be accomplished by varying the operating relationship of a variable member within that linkage when the force engine is in adjusting mode. There is a range of positions or configurations through which the variable member may rotate or otherwise be moved. At one end of the range, is a minimum capacity position of the variable member corresponding to the minimum coupling ratio of the operating relationship. At the other end of the range, is a maximum capacity position of the variable member corresponding to the maximum coupling ratio of the operating relationship. The variable member may be moved or reconfigured to any number of points along this range during the adjusting mode with little or no change in the energy state of the energy reservoir or load. Upon moving, adjusting, or reconfiguring the variable member to the position needed to achieve the needed operating relationship between the energy reservoir and carriage, the variable member's position or operating relationship may then be fixed within the linkage.

Automatic adjustment to a load is accomplished by introducing feedback between the load applied to the carriage and the position of the variable member. To create this feedback system, several key components may be utilized including: a means of coupling the position of the variable member to the displacement of the load, and means of biasing the variable member toward the minimum capacity position.

The components or means of coupling the variable member to the load during the adjusting mode allows the variable member to be displaced toward the maximum capacity position in response to a greater load. The biasing components may cause the force counteracting the load through this coupling means to increase as the load is displaced in the direction of the load. Additionally, the coupling ratio of the variable member to the load may be high, on the order of 10 to 20, meaning that a small displacement of the load in the direction of the load leads to a large displacement of the variable member toward the maximum position.

In adjusting mode, as the load is increased the load may be displaced downward causing the variable member to displace against the biasing component or means, toward the maximum capacity position. The variable member may continue to displace until equilibrium is reached, the balancing force as determined by the position of the variable member counteracting and equal to the load. The operating relationship of the variable member may then be fixed. Counterbalancing systems may preferably be designed and optimized so that the rate at which energy is transferred from the energy reservoir in the operating mode due to the fixed position of the variable member matches the load applied during adjust mode. The provided illustrative embodiments achieving this result.

Multiple mechanisms and general means of coupling the variable member to the load are possible. In one embodiment, during the adjusting mode, the displacement of the variable member is coupled to the displacement of the traveling member. Displacement of the carriage may be transferred through the linkage to the traveling member. Due to coupling between the traveling member and the variable member, a displacement in the carriage will cause a displacement in the variable member. In another embodiment, the load acts on a secondary carriage inside of the main carriage. In the adjusting mode the traveling member may be locked in position, but the secondary carriage is movable inside of the main carriage. The relative displacement of the two carriages may be transmitted through a secondary linkage, such as a sheathed or Bowden cable to position the variable member. In a third embodiment, the linkage is a cable or other similar flexible tension bearing member. A first end of the cable is attached to the variable member, and a second end to the carriage. At least one point of the cable may pass over a pulley attached to a displacing portion of the traveling member. In the adjusting mode the traveling member is fixed. Displacement of the carriage pulls on the cable leading to a displacement of the variable member. In operating mode, the variable member is fixed and displacement of the traveling member leads to displacement of the carriage through the range of movement of the traveling member.

Multiple components and means of biasing the variable member toward the minimum position may be utilized. In one embodiment, a biasing component such as a coil spring or gas spring applies a force to the variable member causing the variable member to tend toward the minimum capacity position. In this configuration the linkage is designed so that there is little or no change in the energy state of the reservoir as the variable member is displaced. In another embodiment, the variable member may be biased toward the minimum capacity by designing the linkage so that as the variable member displaces toward the maximum capacity position, the energy state of the energy reservoir increases, but only slightly. This configuration has the advantage of requiring no extra biasing components. In addition, the reliability of the system is improved because the biasing and force generating are provided by the same component and will age together (i.e. drift). One embodiment accomplishes this by utilizing a variable member which is a rotating arm, a first end of the variable member is attached to ground and a second end is attached to an energy reservoir, such as a spring. The other end of the energy reservoir is attached to some point on the linkage which is close to, but not concentric with the first end of the variable member. As the variable member is rotated, the energy reservoir will displace slightly, increasing the reservoirs energy state and biasing the reservoir in the opposite direction. In another embodiment, a combination of (1) biasing as a result of the energy reservoir displacing as the variable member is moved during adjusting mode, and (2) the use of biasing components is utilized to create the net biasing needed.

Another practical implementation of automatic adjusting counterbalance systems described herein is a component or means for transitioning between the operating and the adjusting mode. The variable member may be fixed during operating mode and free to move as based on the coupling with the load during the adjusting mode. The traveling member is free to move during operating mode. During the adjusting mode, the traveling member is either fixed or coupled to the displacement of the traveling member. It may be preferable that during transitioning between modes, the fixing of the variable member and the traveling member overlap slightly to prevent system instabilities. A number of components, linkages, and other means of achieving overlapping of modes may be utilized Additionally, the performance and usefulness of automatic adjusting counterbalancing systems may be improved by adding additional components to the linkage which change the kinematic relationship between the energy reservoir and the load. This linkage may be used to change the force displacement characteristics from a non-constant profile to a more constant profile. For example, linkages which have a non-constant coupling ratio may be utilized. Additionally, such linkages may be placed in the linkage between the energy reservoir and the traveling member or between the traveling member and the carriage, or in both places, to achieve the desired result.

The usefulness of the counterbalancing system may be increased in an overhead storage system by designing the system and transformations so that the balancing force is not constant throughout the range of motion during operating mode. At the bottom of the range, the balancing force provided may be less than the load, requiring the user to provide a lifting force. This ensures that the carriage does not inadvertently start lifting without the user intending it to do so. At the top of the range, the balancing force provided by the engine may be less than the load, causing the carriage to be pulled into the stored position and preventing the carriage from lowering without the user applying a downward force.

The force engines and auto-balancing systems may utilize different configurations in any number of embodiments. The drawings illustrate a number of those embodiments and in addition systems or components of those embodiments may be combined to form additional embodiments. For example, the embodiments may be characterized by adjustments including: mechanical/manual, automatic, and sensor/actuator. The embodiments may be first characterized by the manner in which the variable member is positioned.

Positioning methods include: (1) External Input—positioning via some external input (manual, actuator, external load, etc); (2) Direct Positioning—positioning based on the load point by kinematically coupling the variable member to the load point; (3) Relative Positioning—positioning by coupling the variable member to the relative load point using a secondary linkage; and (4) Pass through—positioning of the variable member by use of a flexible tension bearing component, a first end of the cable attached to the variable member, a second end to the carriage and at least one point of the cable passing over a pulley attached to a displacing portion of the traveling member.

As second characterization includes the manner in which the force engine or system is biased in the adjusting mode. Biasing methods include: (A) No Biasing—the variable member may be moved to any position with practically no input of energy to the engine or system. In application, this may only work with positioning via an external input, such as direct user input or with an actuator; (B) Biasing Component—the energy reservoir is unbiased, but a separate biasing component is included which biases the variable member to the minimum displacement position. The path of the variable member (or variable member path) is unbiased; and (3) Reservoir Path Biasing—the energy reservoir is designed so that the energy reservoir is slightly biased toward the minimum displacement position. In other words, the path of the variable member is biased.

Combinations of the first and second characterizations may result in the following embodiments illustrated in Table 1.

TABLE 1

Variable Member Positioning

| | | External Input (1) | Direct Positioning (2) | Relative Positioning (3) | Pass Through (4) |
|---|---|---|---|---|---|
| Biasing | No Biasing Free Adjustment (A) | (1A) Free Adjustment (Manual or Actuator Adjustment) | | | |
| | Biasing Component (B) | (1B) | Scheme (2) | (3B) | (4B) |
| | Reservoir Path Biasing (C) | (1C) | Scheme (2C) | (3C) | (4C) |
| | Combination Biasing (D) | (1D) | (2D) | (3D) | (4D) |

Referring now to FIG. 1 illustrating a pictorial representation of a force engine 100 in accordance with an illustrative embodiment. The force engine 100 includes a traveling member 102 hingedly connected to a hinge 104 at a first end 106. The hinge 104 is connected to a frame, wall, or other motionless element or component hereinafter referred to as "ground." In one embodiment, the hinge 104 is a joint that secures the traveling member 102 to ground so that the traveling member 102 may rotate about a center point of the hinge 104. The hinge 104 may be attached to ground and rotate around a pin. Any number of hinges or hinged mechanisms known in the art may be utilized to connect the traveling member 102 to ground.

A second end 108 of the traveling member 102 includes a load point 110 that is directly or indirectly coupled to the load 112. Motion of the traveling member 102 and the load point 110 drives the motion of the load 112. The load 112 is illustrated as indirectly coupled to the load point 110 by a cable 114. In one embodiment, the cable is a braided cable. However, a rope, line lead, chain, or belt may alternatively be utilized. The traveling member 102 may also be coupled to the load 112 by a linkage, or translation component. The load 112 represents one or more weights, applied forces, or goods that are moved through a displacement path. The counterbalancing force 112 substantially counteracts the load 112 or the force of gravity acting on the load 112. The load point 110 is the point, portion, or segments of the traveling member 102 from which the load 112 is applied or driven. Alternatively, the load point 110 may be any point along the traveling member 102. The load point 110 may vary between the illustrative embodiments. The traveling member 102 travels the same displacement for every load 112 regardless of whether it is any load between a minimum and maximum.

The traveling member 102 may be temporarily coupled to a variable member 116 during the adjusting mode as is subsequently described. The variable member 116 may include a first end 118 hingedly connected to a hinge 120 which is attached to ground and rotating about a pivot point 119. The hinge 120 may be similar to the hinge 104. A second end 122 of the variable member 116 may be hingedly attached to an energy reservoir 124 including a first end 126 and a second end 128. In one embodiment, the traveling member 102 and the variable member 116 are mechanical arms that may rotate during the adjusting mode with only the traveling member 102 moving during the operating mode to drive the load 112.

In one embodiment, a variable member lock 130 may fix the positions of the second ends 122 and 128 of the variable member 116 and the energy reservoir 124, respectively. In one embodiment, the variable member 116 may include a release that engages the variable member lock 130 to fix the position of the second ends 122 and 128. For example, the variable member lock 130 is a tooth plate that engages with a latch. In other embodiments, the variable member lock 130 may include a pin and hole configuration for locking the position of the variable member 116. The variable member lock 130 may be engaged and disengaged. The variable member 116 may include a slot operable to receive a roller 132 of the traveling member 102 to create a coupling between the traveling member 102 and the variable member 116. In another embodiment, the slot on the traveling member 102 receives a roller 132 on the variable member 116. Any number of other high ratio couplings between the traveling member 102 and the variable member 116 may also be utilized. For example, coupling may include four bar linkages, gears, pulleys and cables, and other known configurations. The linkage slot 170 and roller 132 are shown for purpose of understanding potential couplings that may be used.

The force engine 100 is configured to operate in an adjusting mode and an operating mode. These modes may be alternatively described as a weighing/counterbalance synchronization mode and a lifting mode. In the operating mode, the load 112 is raised and lowered and the energy reservoir 124 provides and receives the energy gained and lost by the load 112. In the adjusting mode, the load 112 may be either increased or decreased and a magnitude of the force provided by the energy reservoir 124 may be adjusted to match the load 112.

In one example, in the adjusting mode, the variable member 116 is temporarily coupled to the traveling member 102. As the traveling member 102 rotates downward, the variable member 116 also rotates downward and increases the angle between the energy reservoir 124 and the traveling member 102. The roller 132 rides in the slot of the variable member 116. The roller 132 may be located coincident or nearly coincident with an attachment point 135 of the energy reservoir 124 to the traveling member 102. As a result, a length of the energy reservoir 124 changes very little or not at all. A bias component (not shown) may be utilized to bias the variable member 116 toward a minimum capacity position. Alternatively, the location of the roller 132 and the attachment point 135 may be positioned close to each other, but not coincident to bias the variable member 116 toward a minimum capacity position for the energy reservoir 124.

Increasing the angle of the variable member 116 away from the traveling member 102 increases the angle at which the energy reservoir 124 approaches the variable member 116 thereby increasing the torque applied to the traveling member 102 to increase the balancing force for an increased load 112. When a load 112 is placed on the traveling member 102, the traveling member 102 begins to rotate clockwise thereby causing the variable member 116 to rotate counterclockwise and increasing a balancing torque. When the balancing torque equals a torque applied by the load 112 to the traveling member 102, the traveling member 102 stops rotating. One a user input is provided by the user, the variable locking member 130 locks the variable member 116 in place. At this point, the force engine 100 has transitioned between the adjusting mode and the operating mode.

In the adjusting mode, the force engine 100 acts as a closed feedback system. The load 112 causes the load point 110 to be displaced. Displacement of the load point 110 is linked to a position of the variable member 116. As the variable member 116 is displaced or rotated it causes the balancing torque provided by the energy reservoir 124 (or a biasing component) to be increased or decreased. The increase in balancing torque on the force engine 100 arrests further displacement of the load point 110. At this point, the user may provide input to enter the operating mode. The closed loop feedback system of the force engine 100 has moved the variable member 116 to a position required for the energy reservoir 124 to balance the load 112 throughout an operating range of the load 112.

The balancing forces generated by the force engine 100 during operating mode are a function of the displacement or rotation of the variable member 116 and are not dependent on the load 112. Moving the variable member 116 determines how much of the energy capacity of the energy reservoir 124 is utilized and the applied balancing force. In particular, the variable member 116 may be released, repositioned, and fixed in place. The adjustments to the force engine 100 may be performed automatically or manually.

In the illustrative embodiments, no lifting is done in the adjusting mode. In the operating mode, the variable member 116 is fixed and the load 112 may be lifted and lowered. The amount of displacement of the energy reservoir 124 may be configured to match the load 112 by varying the operating or kinematic relationship between the traveling member 102 and the energy reservoir 124 in the adjusting mode. The operating relationship is the positioning and angles of the energy reservoir 124, traveling member 102, and the variable member 116 relative to each other. As a result, the energy exchanged between a partial load over the displacement range of the energy reservoir 124 and the full effort or energy provided by the energy reservoir 124 over a partial range of the energy reservoir 124 are substantially equal. In the two different modes, the force engine 100 acts as different mechanisms and thereby is more efficient than many previous force generation systems that were only manually adjustable. In addition, the force engine 100 is capable of providing a variable counterbalancing force to accommodate the load 112.

Once the corresponding torques are balanced, the variable member 116 is fixed along its corresponding rotation by the variable member lock 130. The roller 132 is released from the slot, disengaging the coupling of the traveling member 102 and the variable member 116. The variable member 116 is fixed in the operating mode such that the second end 122 of the variable member 116 provides a base/ground for the energy reservoir 124 to drive motion of the traveling member 102. The force transmitted to the load 112 is dependent on the operating relationship of the variable member 116 as positioned during the adjusting mode.

Motion of the second end 122 of the variable member 116 along the variable member lock 130 before it is fixed or locked in place is referred to as the displacement along the a path. In one embodiment, the energy reservoir 124 is a compressed or extension gas spring. As known in the art, a compressed gas spring stores energy by pressing a rod into a chamber of a compressed gas. Compressed gas springs are useful because of low progressivity to thereby provide a more constant force. In another embodiment, the energy reservoir 124 is a coil spring (compression or tension). In other embodiments, the energy reservoir 124 may be a torsional spring, deflecting beam, electromagnets, one or more masses acting against gravity, or a buckling beam.

In other embodiments, the traveling member 102 may be referred to as a lift arm, the variable member 116 as an adjustment arm, the energy reservoir 124 as a spring, gas spring, compression spring, torsion spring, the hinges 104 and 120 as bases, and the variable member lock 130 as a tooth plate to name a few alternative terms.

Figure 2:
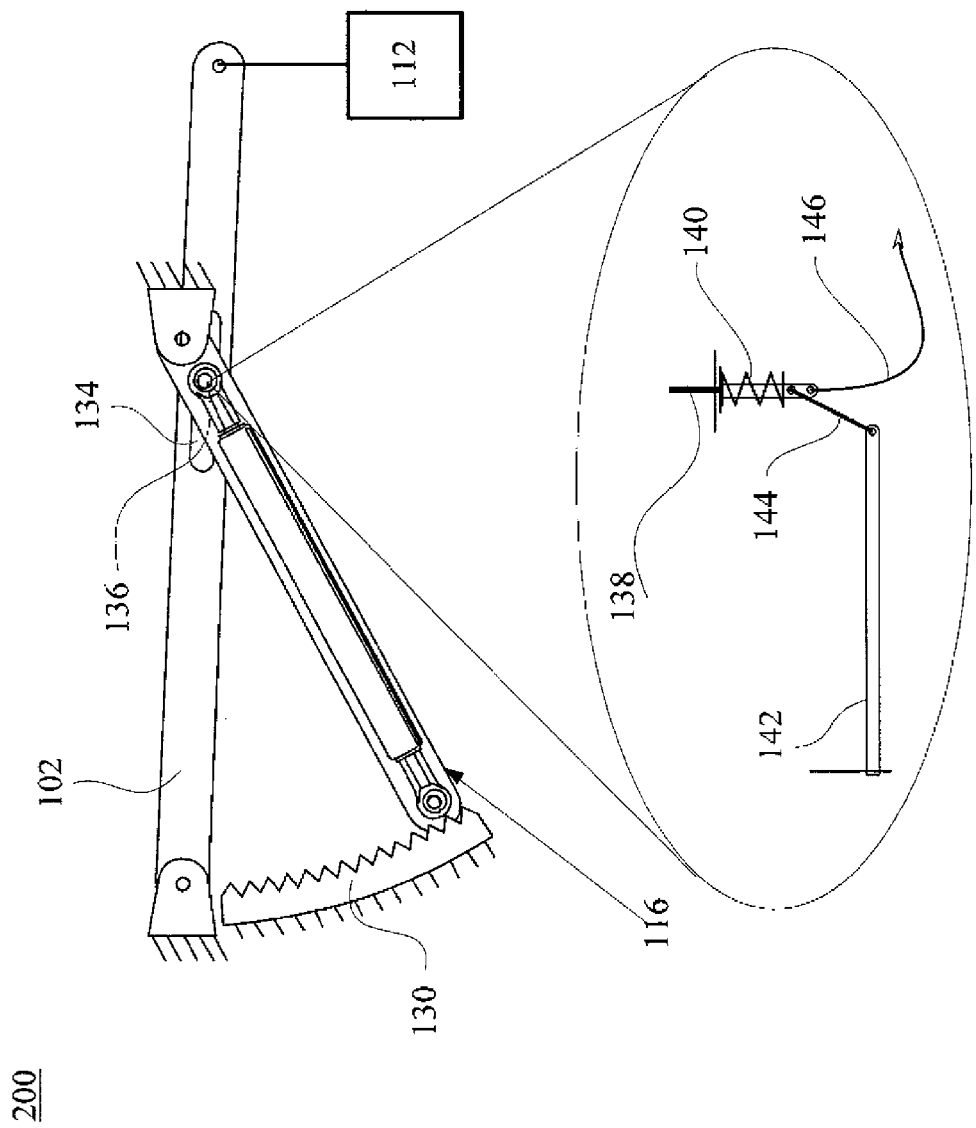

Turning now to a force engine 200 of FIG. 2. The force engine 200 is an alternative embodiment of the force engine 100 of FIG. 1. The traveling member 102 may define a slot 134. A release 136 is operable to engage the slot 134 and fix the variable member 116 against the variable member lock 130.

In one embodiment, the release 136 includes a pin 138. The pin 138 is mounted to the variable member 116. The pin 138 is biased by a spring 140. The pin is coupled to a rod 142 by a rod 144 and separately coupled to cable 146. The rod 142 extends along a length of the variable member 116. The pin 138 engages with the slot 134 to fix the variable member 116 to the traveling member 102 during the adjusting mode to create a coupling. The pin is retracted during the operating mode such that the rod 142 engages with the variable member lock 130 to fix the position of the variable member 116 and establish the operating relationship. The cable 146 may be coupled directly or indirectly to a handle, lever, dial, or other mechanical interface for receiving user input to enter the operating mode. In one embodiment, the pin 138 may be configured, such that the pin 138 automatically engages with the slot 134 in response to the traveling member 102 being displaced to a load/unloading position.

The release 136 is one of multiple releases that may be utilized to fix the variable member 116 during the operating mode and couple the traveling member 102 and the variable member 116 during the adjusting mode.

Figure 3:
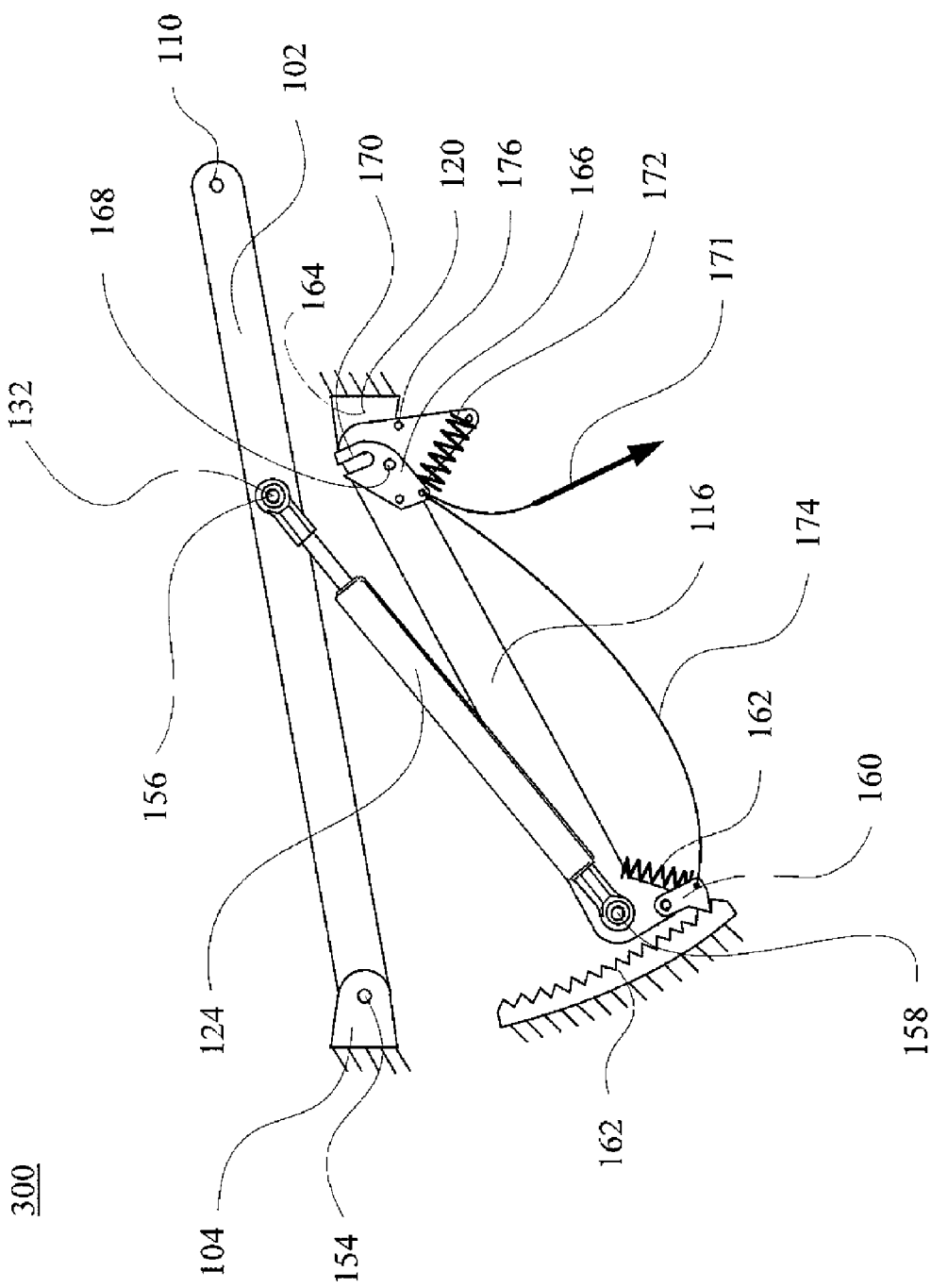
Figure 4:
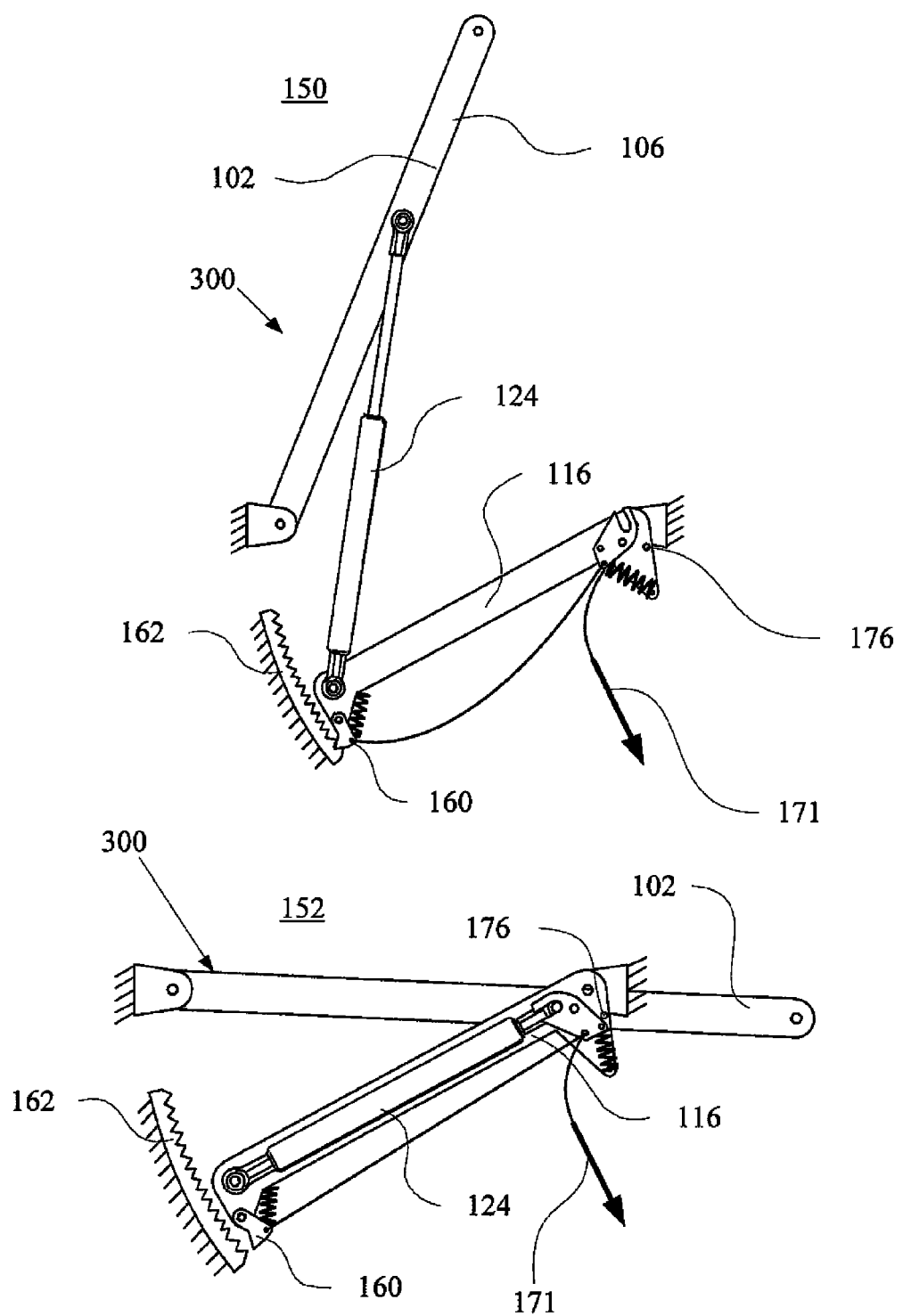

FIGS. 3 and 4, FIGs. illustrate a force engine 300. FIG. 3 is more detailed embodiment of the force engine 100 of FIG. 1 and includes many of the same components and functions. FIG. 4 illustrates the force engine 300 in a lifting mode 150 and an adjusting mode 152. The force engine 300 may include the traveling member 102 hingedly connected to the hinge 104 and rotating about a pivot point 154. As shown in FIG. 3, various components of the force engine 300 are connected or pinned to ground (i.e. a framework or case). In one embodiment, the traveling member 102 may be connected to a cable 114 at a load point 110. The load point 110 may also represent a pulley rotationally attached to the traveling member 102.

The traveling member 102 is hingedly connected to an energy reservoir 124 at attachment point 156. The traveling member also includes the roller 132 located nearly concentric with the attachment point of the energy reservoir 124, but may be located at a different depth in our out of the plane. The attachment point 156 is near a load end of the traveling member 102. The roller 132 may be a roller or pin. The biasing component or energy storage device may be a constant force spring. In one embodiment, the bias component is the energy reservoir 124. The first end of the energy reservoir 124 is connected to the traveling member 102 at the attachment point 156 and the second end of the energy reservoir 124 is hingedly connected to the variable member 116 at an attachment point 158.

The second end of the variable member 116 includes a latch 160 hingedly connected to the variable member 116 and is connected to a latch spring 162. The latch 160 slidably interfaces with a tooth plate 162. In one embodiment, the tooth plate 162 has an arched shape and is affixed to the case or support structure of the force engine 300. The tooth plate 162 and latch 160 allow the operating relationship between the variable member 116 and the traveling member 102 to be fixed such that the energy reservoir 124 provides a force corresponding to a load 112 applied at the load point 110.

The first end of the variable member 116 may be hingedly connected to a hinge 120 with a pinned connection to ground that rotates about a pivot point 164. A rotational linkage 166 is hingedly connected at the first end of the variable member 116 and rotates about an attachment point 230. The rotating linkage 166 includes a linkage slot 170 and is connected to a stay spring 172. The motion of the rotating linkage 166 may be limited by a stop 176. The rotating linkage 166 is connected to the latch 160 by a decoupling linkage 174. In one embodiment, the decoupling linkage is a cable. The stay spring 172 biases the rotating linkage 166 such that the decoupling linkage 174 does not disengage the latch 160 from the tooth plate 162 until the roller 132 engages with the slot, causing the linkage to rotate and pull the latch 160 out of place to overcome the stay spring 172 and disengage the latch 160 by tension through the decoupling linkage 174. As previously described, the traveling member 102 may be connected to the carriage directly or indirectly through a linkage, such as a pulley and cable system.

As previously described with regard to FIG. 4, the force engine 300 is configured to operate in two modes: an adjusting mode 152 and an operating mode 150. In one example, during the adjusting mode 152, the traveling member 102 is lowered such that the roller 132 slides into the linkage slot 170. When coupled, the roller 132 is inserted into the linkage slot 170 causing the rotating linkage 166 to rotate and pull taught the decoupling linkage 174. As the rotating linkage 166 continues to rotate, the rotating linkage 166 compresses the spring 172 until it has reached a maximum compression. As the rotating linkage 166 continues to rotate, the spring 172 applies a counterclockwise torque to the rotating linkage 166 that continues to disengage the latch 160. By the time that the rotating linkage 166 has come to rest against the pin 176 the latch 160 is entirely disengaged. As a result, the force engine 300 may automatically transition from the operating mode to the adjusting mode in response to the traveling member 102 being lowered to couple with the variable member 116. Once the latch 160 is disengaged from the tooth plate 162 such that the attachment point 216 of the variable member 116 may rotate up or down the tooth plate 162 to a position corresponding to a weight of the goods in the carriage. To reengage the latch 160, the user provides user input on cable 171 causing the rotating linkage 166 to release the roller 132 and allowing the spring 162 to push the latch 160 into the tooth plate 162. For example, a handle engaged by the user may pull on the cable.

During the adjusting mode, the variable member 116 and the energy reservoir 124 are nearly aligned and the ends near the tooth plate 162 move in unison to a position along the tooth plate 162 that configures the energy reservoir 124 to provide a force required to lower and raise the load 112 with minimal user input. When the latch 160 is engaged at the bottom of the tooth plate 162 (or maximum capacity point), the force engine 300 is configured to provide the most force corresponding to the maximum load of the force engine 300. When the latch 160 is engaged at the top of the tooth plate 162 (or minimum capacity position), the force engine 300 is configured to provide the minimum force that may be required to lift the carriage with a zero or minimal load.

During transition between the two modes, the coupling and uncoupling and fixing and unfixing of the latch 160 overlap slightly such that the force engine 300 does not enter an unstable position or a state during which the energy stored by the energy reservoir 124 rapidly releases stored energy or accelerates the load.

FIG. 4 shows the force engine 300 being utilized in the operating mode 150 and in the adjusting mode 152 to further illustrate the described components and their interactions, the method of operation, and functionality of the force engine 300.

During the operating mode 150, the energy reservoir 124 extends the traveling member 102. The energy reservoir 124 is able to extend the traveling member 102 hinged on the support from the interconnected variable member 116 and affixed position of the latch 160 against the tooth plate 162. The position or displacement of the latch 160 along the tooth plate 162 corresponds to the stored energy used by the force engine 300 and applied by the energy reservoir 124. The latch 160 being positioned at the top of the tooth plate 162 generally corresponds to a minimum force being applied by the energy reservoir 124. The latch 160 being engaged at the bottom of the tooth plate 162 corresponds to a maximum force being applied by the energy reservoir 124. The tooth plate may lock the variable member 116 at many positions and is operable to bear the load exerted on the variable member 116 by the energy reservoir 124 during the operating mode 150. The latch 160 is able to engage with the tooth plate 162 once user input is provided to reengage the latch 160 through the cable 171.

Figure 5:
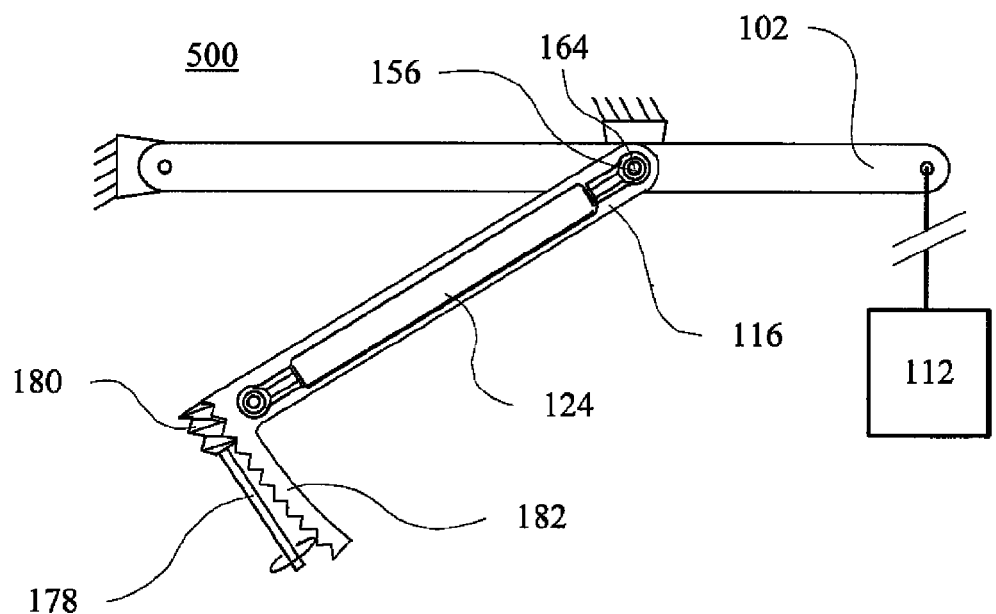

Turning now to FIG. 5 showing a pictorial representation of a manual adjust engine 500. The manual adjust engine 500 may include many of the same components as the auto-balancing engine 200 of FIG. 2. In one embodiment, the user may manually set the position of the variable member 116 and the corresponding operating relationship of the traveling member 102 and the energy reservoir 124 for selecting the balancing force. The adjustment is performed based on the user input with minimal or no compression or change of the energy state of the energy reservoir 124. This results from the attachment point 156 being coincident with the pivot point 164. The user may adjust the manual adjust engine 500 utilizing a knob, lever, handle, strap, dial, pedal, button, or other mechanical adjustment component.

In one embodiment, a dial (not shown) may be directly or indirectly coupled to a shaft 178. The shaft 178 may include an auger end 180. The auger end 180 may be operable to interface with teeth 182 of the adjustment arm 116. Turning the dial and corresponding shaft 178 positions the teeth 182 and corresponding adjustment arm 116 such that the energy reservoir 124 or other energy storage element is positioned and biased to provide the required force to the traveling member 102.

Figure 6:
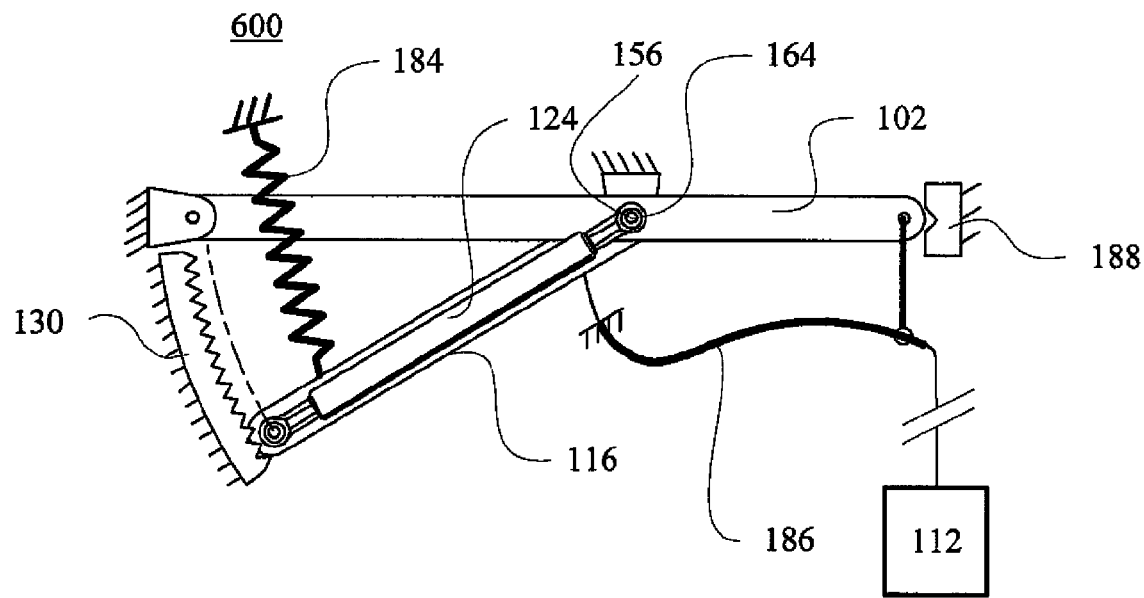

In FIGS. 6-9, the biasing may be performed by a biasing component 184 or by biasing the path of the energy reservoir 124. Also, FIG. 6-9 illustrates a variety of ways of linking the position of the variable member 116 to the displacement of the load 112. The combinations shown are a few of many combinations possible. Turning now to FIG. 6 illustrating a force engine 600. In addition to many of the components of the force engine 100 of FIG. 1. The force engine 600 includes additional components. In particular, the biasing component 184 may bias the variable member 116 toward a minimum capacity position. For example, a coil spring may bias the variable member 116 toward a minimum capacity position. In one embodiment, the bias component 184 is a coil spring with a first end connected to ground and a second end connected to the variable member 116. As a result, the energy reservoir 124 is not utilized for biasing the variable member 116. The pivot point 164 is positioned coincident with an attachment point 156 of the energy reservoir 124 to the traveling member 102 when fixed in the adjusting mode. The variable member 116 may be moved without significant changing the length (and thus energy state) of the energy reservoir 124. When the force engine 600 changes to the operating mode, the variable member 116 is fixed and the traveling member 102 is released.

In the adjusting mode the traveling member 102 is fixed and a load 112 is coupled to the variable member 116 by a sheathed cable 186 or other secondary linkage. The sheathed cable 186 may move with the traveling member 102 during the operating mode while still allowing the rotation of the variable member 116 during the adjusting mode. By attaching the sheathed cable 186 near a pivot point 164 of the variable member 116, the load 112 displaces only slightly to move the variable member 116 through the entire range of motion of a path.

The force engine 600 may further include a traveling member lock 188. The traveling member lock 188 may be operable to secure the traveling member 102 in the adjusting mode and release the traveling member 102 in the operating mode. The traveling member lock 188 may utilize a hook, latch, pin, bolt, or other release mechanism.

Figure 7:
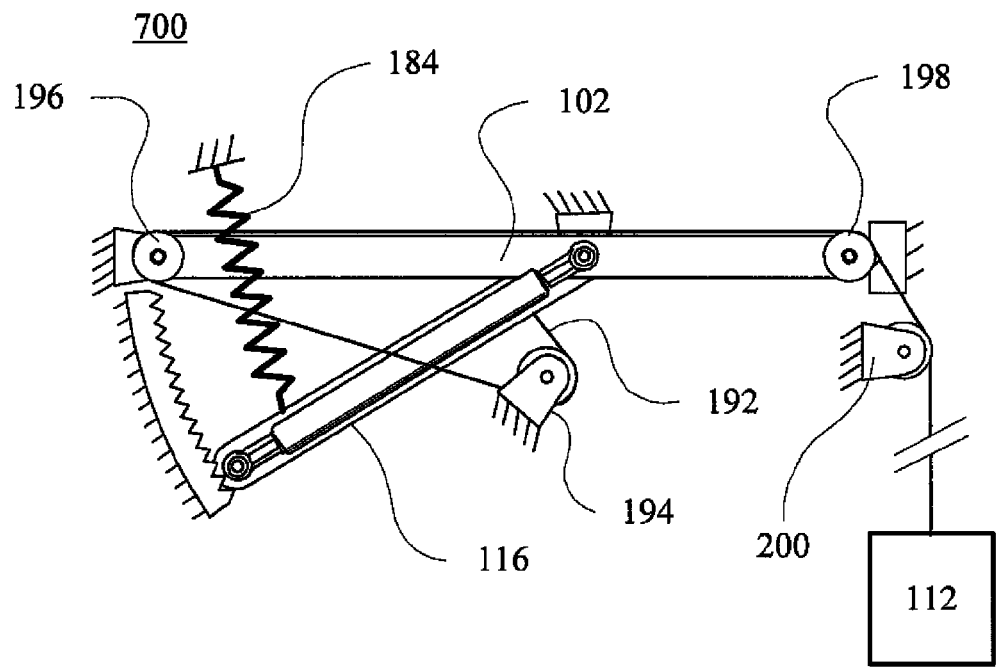

FIG. 7 is a pictorial representation of a force engine 700 in accordance with another illustrative embodiment. The force engine 700 is similar to the force engine 600 of FIG. 6 with some minor changes to the path of the cable 192 through pulleys 194, 196, 198, and 200. The pulleys 194 and 200 may be attached to ground as previously described. The pulleys 196 and 198 are attached to the traveling member 102. The pulleys 194, 196, 198, and 200 redirect the cable to transform the force provided by the energy reservoir 124 and applied through the traveling member 102 to the load 112. In adjusting mode, the traveling member 102 is fixed, and the variable member 116 is free to move. As additional load is applied to the cable or carriage attached to the cable, the cable displaces in the direction of the load 112. This displacement pulls on the variable member 116 causing it to displace toward the maximum capacity position. As the variable member 116 displaces the variable member 116 stretches the biasing component 184, increasing the force transmitted by the biasing component 184 through the cable to the load 112. The load 112 keeps displacing until the force from the biasing component 184 equal the force from the load 112. In response to a user input, the variable member 116 may be locked and the traveling member 102 may be freed to rotate. The variable member 116 is now positioned to provide the counterbalancing force needed to lift the load 112 through the range of motion. The force engine 700 provides a more simple mechanical mechanism for coupling the load 112 to the variable member 116. The traveling member 102 may be simply locked during operating mode utilizing any number of locking mechanisms known the art and described herein.

Figure 8:
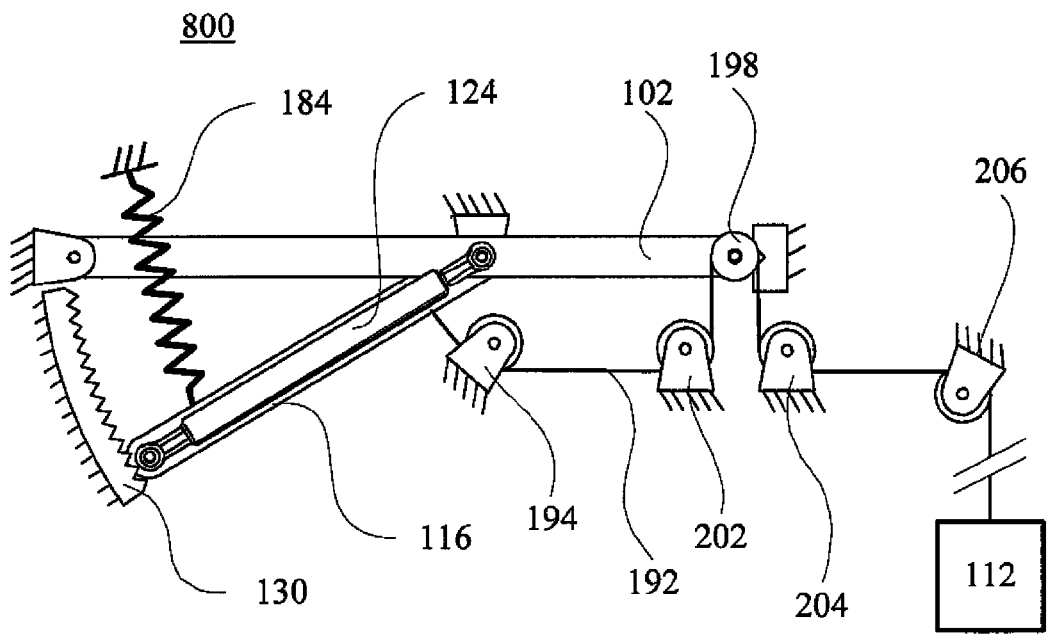

FIG. 8 is a pictorial representation of a force engine 800 in accordance with another illustrative embodiment. The force engine 800 is similar to the previously described embodiments. The force engine 800 utilizes pulleys 194, 202, 204, 204, and 206 to apply the counterbalancing force to the load 112. The pulleys 194, 202, 204, and 206 may also be attached to ground. An advantage of this configuration is that the displacement of the cable 192 as a result of the rotating traveling member 102 is twice the displacement of the cable 192 in the force engine 700.

Figure 9:
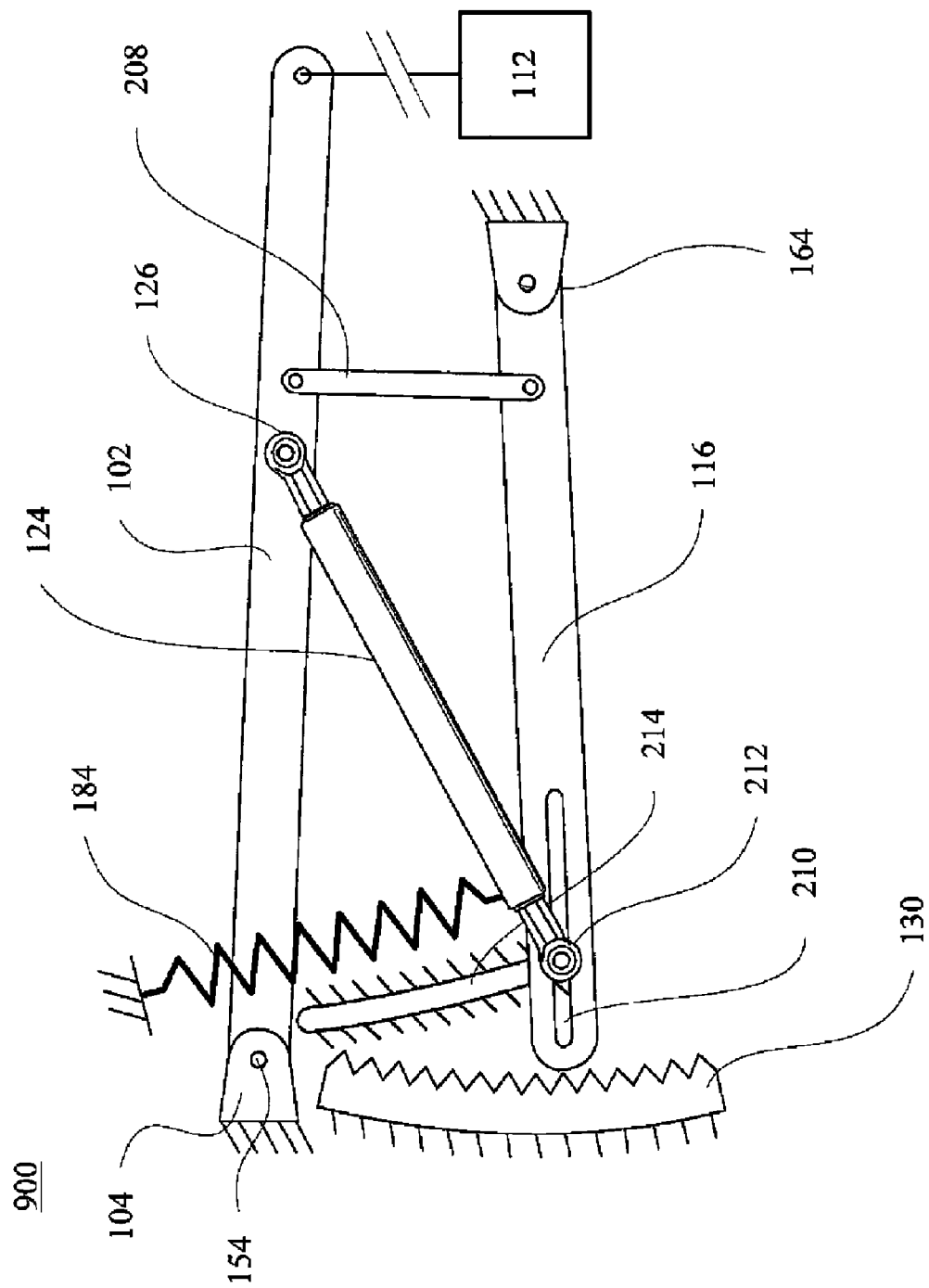

Turning now to FIG. 9, FIG. 9 illustrates a force engine 900. The force engine 900 is similar to the previously described embodiments. The force engine 900 may include a link 208 connecting the traveling member 102 to the variable member 116. The link 208 is a coupling member attached far from the pivot point 154 of the traveling member 102 and close to a pivot point 164 of the variable member 116, thereby achieving a high mechanical advantage between the traveling member 102 and the variable member 116. The variable member 116 defines a slot 210 for allowing a roller 212 attached to an end of the energy reservoir 124 to be slidably displaced. A track 214 may be further connected to ground allowing the roller 212 and corresponding ends of the energy reservoir 124 and the variable member 116 to be slidably displaced anywhere along the track 214.

Movement of the variable member 116 does not change the energy state of the energy reservoir because the track 214 is shaped so that as the ends of the reservoir 126 and 128 move the length of the energy reservoir 124 does not change. The energy state change of the load 112 is transferred or taken up by the energy state of the energy reservoir 124. The load 112 will displace until the force engine 900 reaches equilibrium and the bias component 246 adjust the variable member 116 and the energy reservoir 124, such that the force engine 900 provides the energy profile with at the proper magnitude to drive the load 112.

Figure 10:
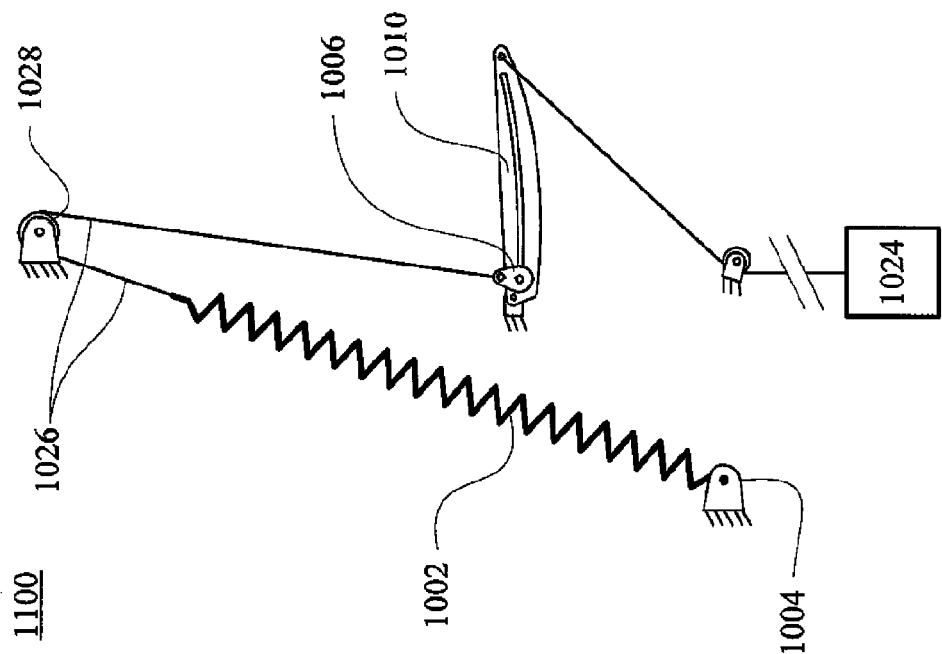

FIG. 10 is a pictorial representation of a force engine 1000 in accordance with another illustrative embodiment. The force engine 1000 illustrates another configuration. As shown, an energy reservoir 1002 is connected at one end to a base 1004 attached to ground. The other end of the energy reservoir 1002 is coupled to a variable member 1006. The variable member 1006 is slidably coupled to slot 1008 defined in a traveling member 1010 during adjusting mode. For example, the variable member 1006 may connect through the slot 1008 on either side of the traveling member 1008. The variable member 1006 slides along the slot 1008 to reach an equilibrium point. There is a means of pivotally fixing the position of the variable member 1006 within the slot upon transition from adjusting mode to operating mode.

One end of the variable member 1006 may be coupled to a biasing component 1012. The biasing component is coupled to ground on another side for biasing the motion of the variable member 1006 toward a minimum capacity position. The shape of the slot 1008 may also be formed so that it biases the variable member 1006 to the minimum position. Arm 1014 is hingedly coupled to the variable member 1006 and arm 1016. Arm 1016 is hingedly coupled to arm 1014 on one end and ground on another end. Arm 1018 is coupled to the traveling member 1010 during adjusting mode. A roller 1019 at the end of arm 1018 acts on the arm 1016 to create a coupling between the traveling member 1010 and the variable member 1006. Displacing the traveling member 1010 a small amount may cause the variable member 1016 to be displaced a large amount. This coupling is only active during the adjusting mode. When transitioning to adjusting mode, the variable member is released. Any number of mechanisms may be utilized to couple the displacement of the load 1024 to the displacement of the variable member 1006. In one embodiment, the linkage may utilize a cable 1026 which is attached to the variable member 1006 at one end and the load 1024 or carriage at the other end, and passes over at least one pulley located on the traveling member 1010 similar to FIG. 7. In another embodiment the force engine 1000 may utilize a sheathed cable or Bowden cable configured similar to FIG. 6.

Additionally, the force engines shown in FIG. 10-14 may be manually adjustable by not including a component for coupling the load 1024 to the variable member 1006. The biasing component 1012 may be excluded to make the adjustment effortless. Biasing may be still included in manually adjustable engines to provide feedback to the user in the form of a force resisting adjustment to the maximum capacity position.

A cable 1026 couples a load point 1022 of the traveling member 1008 to the load 1024 through one or more pulleys including pulley 1025. As previously described, the variable member 1006 may be fixed during operating mode and released to travel along the traveling member 1008 in the adjusting mode. By adjusting the position of the variable member 1006 and corresponding energy reservoir 1002 the energy reservoir may use the adjustable length of a moment along the traveling member to counterbalance the load 1024 through weight changes.

By positioning the pulleys in different places we are able to achieve a constant force output to match the load 1024. In many cases, the force output at the load point 1022 is not constant, but by creating a transformation, the force output may be changed to a constant force.

Figure 11:
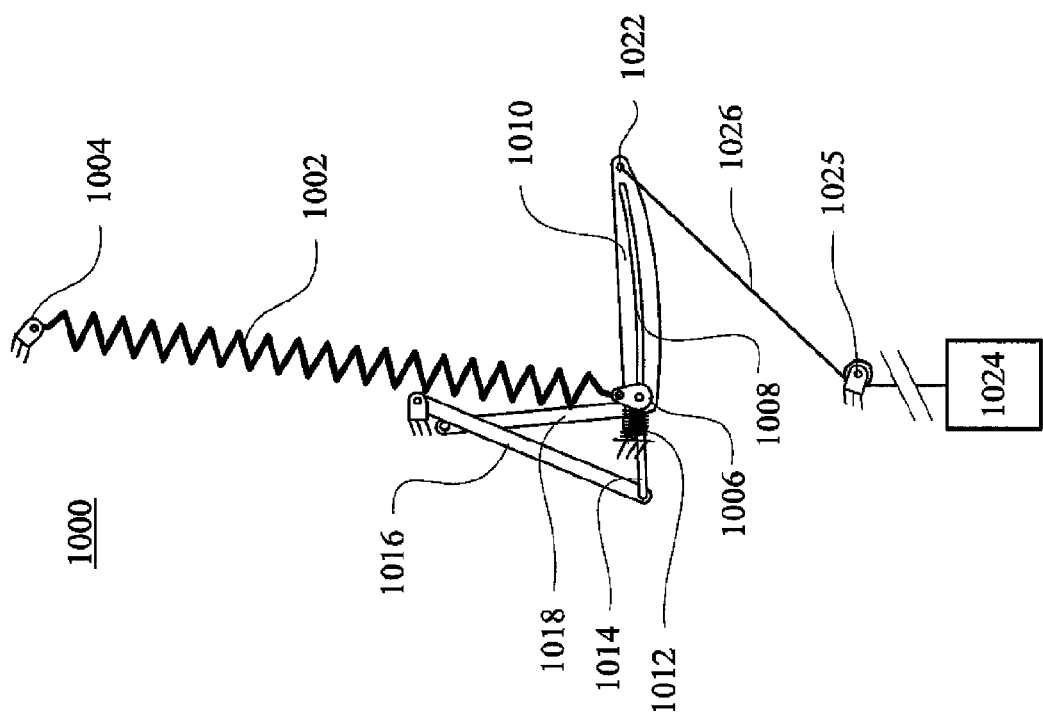

FIG. 11 is a pictorial representation of a force engine 1100 in accordance with another illustrative embodiment. The force engine 1100 includes components similar to those of the force engine 1000 of FIG. 10. The energy reservoir 1002 may be a coil spring, such as a tension spring. The energy reservoir 1002 may be positioned remotely from the main body of the force engine 1100 and any number of orientations. As a result, a larger or higher capacity energy reservoir 1002 may be utilized outside of enclosed area in which the force engine is used. Additionally, an enclosure or housing of the force engine 1100 may be much smaller. As a result, any number of standard springs, zero free length spring, sub zero free length spring, pre-tensioned spring, or very long springs may be incorporated into the force engines and auto-balancing systems. Also, there is more flexibility in positioning the point 1028 to achieve enhanced performance.

The energy reservoir is connected to the base 1004 at one end and a cable 1026 at another end. The cable 1026 may be routed through one or more pulleys including a routing pulley 1028 to redirect the force applied by the energy reservoir 1002 through the cable 1026.

Figure 12:
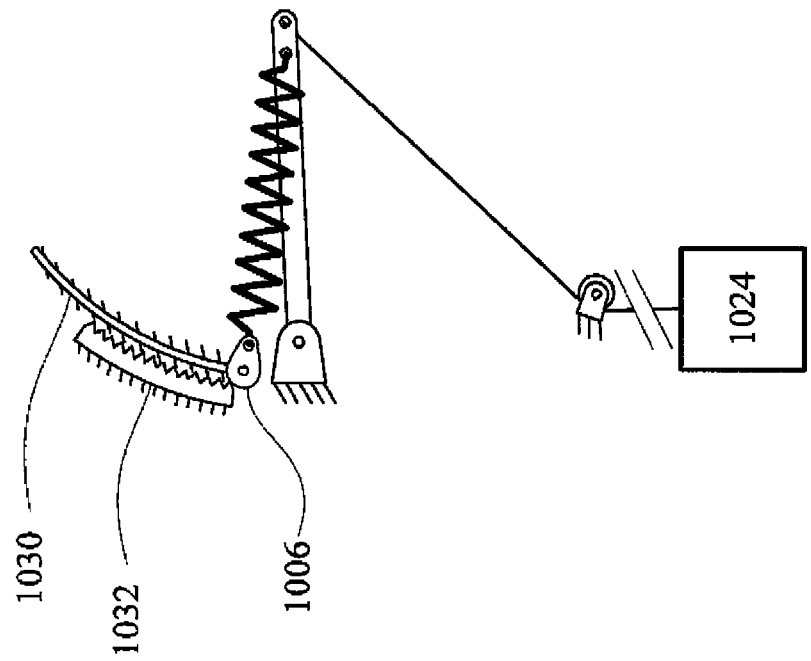

Turning now to FIG. 12, FIG. 12 illustrates a force engine 1200 according to another embodiment. The force engine 1200 further illustrates a combination of the previous embodiments. The variable member 1006 may slide along a path 1030 and may be fixed against a tooth plate 1032 using a release or latch as previously disclosed in an operating mode. Furthermore any number of means for coupling the variable member to the load may be used. Any of the previously describe components and means of biasing the variable member to the minimum position may also be utilized including using a biasing component or biasing the path of the spring along the path.

Figure 13:
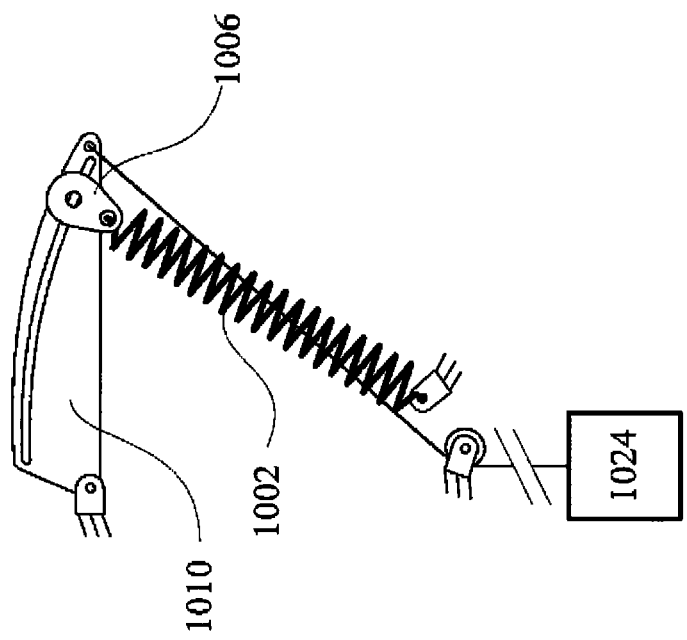

FIG. 13 illustrates a force engine 1300. By placing the energy reservoir 1002 below the traveling member 1010, the overall size of the force engine 1300 may be reduced. The previously described embodiments of the force engines may also be configured as shown in FIG. 13. In another embodiment automatic adjustment is achieved utilizing the systems and components for fixing the variable member 1006 and releasing the variable member 1006 in the different modes. Similarly, different techniques for biasing the variable member to the minimum capacity position may be utilized.

Figure 14:
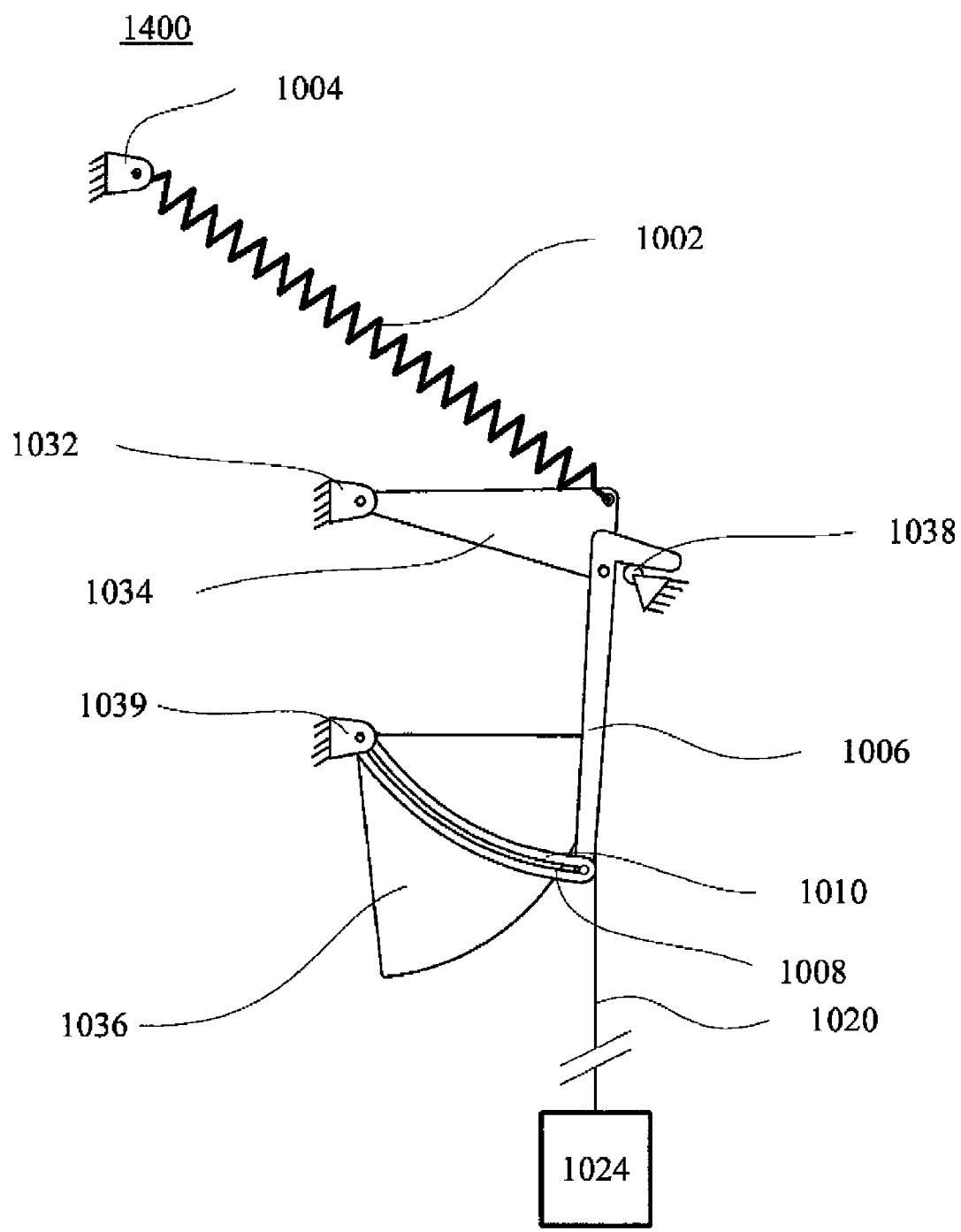

Turning now to FIG. 14, FIG. 14 illustrates a force engine 1400 in accordance with another illustrative embodiment. The force engine 1400 may include many of the components of the previous embodiments. This embodiment employs an additional linkage between the energy reservoir 1002 and the traveling member 1010 which provides a kinematic transformation that enables enhanced performance and consistent application of the balancing forces. One end of the energy reservoir 1002 is coupled to the base 1004. The other end of the energy reservoir 1002 is coupled to a torque arm 1034. The torque arm 1034 is hingedly coupled to a base 1036 at one end and hingedly coupled to the energy reservoir 1002 and the variable member 1006 on opposing sides. In one embodiment, the variable member 1006 is shaped like a backwards seven. A roller 1038 is connected to ground and may be utilized to provide a stop and free rotation point for the variable member 1006 during the operating mode.

Another end of the variable member 1006 is slidably coupled to the traveling member 1010 that also defines the slot 1008 during the adjusting mode. The end of the traveling member 1010 may be hingedly fixed in the slot 1008 during the operating mode. The traveling member 1010 is fixedly connected to a quarter pulley 1040. Another end of the traveling member 1010 is hingedly connected to a base 1039 that is connected to ground. The quarter pulley 1040 provides a constant transformation from the torque of the traveling member 1010 to the lifting force of the cable and also ensures that the load 1024 is always lifted straight up and down. In another embodiment, the load 1024 may be connected through a cable that is attached directly to the traveling member 1010 and routed through pulleys to another location, or to provide a transformation to improve the performance of the force engine 1400. As the variable member 1006 adjust to a changing weight of the load 1024 by sliding along the slot 1008, the variable member 1006 slides up and down and pivots against the roller 1038. The variable member 1006 is fixed to the traveling member 1010 during the operating mode. For example, an increased load 1024 cause the variable member 1006 to rotate around the roller 1038 and pull on the torque arm 1034. As a result, the variable member 1006 rotates clockwise toward a maximum capacity position.

In this embodiment, the variable member 1006 is biased toward the minimum position by shaping the slot 1008 so that the energy reservoir 1002 is displaced slightly as the variable member is displaced toward the maximum capacity position. In another embodiment, the slot 1008 is shaped so that the energy state of the variable member 1006 does not change as the variable member 1006 is displaced toward the maximum capacity position. A separate biasing component attached from a pivot point 1039 to the end of the variable member 1010 may bias the variable member 1010 toward a minimum capacity position.

In another embodiment, the cable 1020 connected to the load 1024 is routed over pulleys on the traveling member 1010 and on the torque arm 1034 and attached to the variable member 1006 to achieve the coupling of the load to the variable member 1010. In this example, the roller 1038 is not used. In another embodiment, a sheathed cable or Bowden cable may be utilized to achieve the coupling of the variable member 1010 to the load as described in the included framework. In another embodiment the traveling member 1010 is located above the torque arm 1034 instead of below it.

Figure 15:
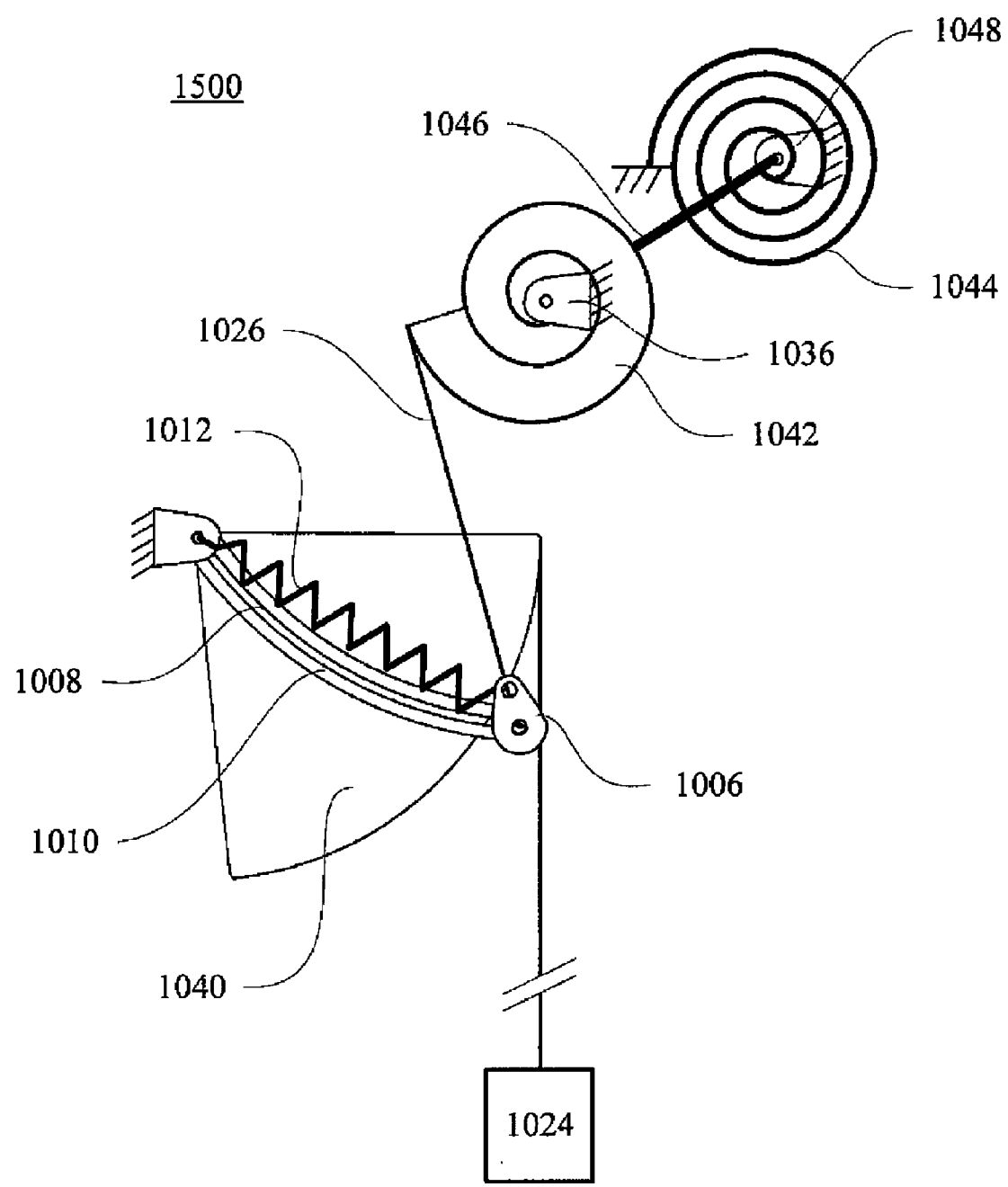

Turning now to FIG. 15, FIG. 15 illustrates a force engine 1500 in accordance with another illustrative embodiment. Similar methods of biasing the variable member to the minimum position, and coupling the variable member 1006 to the load may be used with this configuration. Force engine 1500 provides another example of a means for transforming the force-displacement characteristics of the energy reservoir before interaction with the traveling member 1010 to achieve better performance. As with the previous embodiments, the variable member 1006 is slidably attached to the slot 1008 of the traveling member 1010. The variable member 1006 is connected to the biasing component 1012. The traveling member 1010 is fixedly coupled to the quarter pulley 1040. The quarter pulley 1040 is coupled to the load 1024. The variable member 1006 is coupled to a pulley of varying radius by a cable 1026. In one embodiment this is a spiral pulley 1042. The spiral pulley 1042 rotates about base 1036 which is connected to ground. The spiral pulley 1042 is attached to a torsional spring 1044 by a rotating shaft 1046.

The torsional spring 1044 is connected to the base 1048 and rotates counterclockwise when the torsional spring 1044 is being compressed or storing energy and clockwise when it is releasing energy to the spiral pulley 1042 through the rotating shaft 1046. The torsional spring 1044 acts as the energy reservoir. In one embodiment, the torsional spring 1044 is similar to those utilized for garage doors and other commercial applications. In another embodiment, the torsional spring 1044 may be replaced by a tension spring, attached to ground at one end, and a cable at the other end. The cable 1026 may then attached be attached to a rotating pulley on the shaft 1046. The spiral pulley 1036 assists in transforming the linear nature of the torsional spring 1044 to a constant force profile.

The torsional spring 1044 provides a counterbalance force to the traveling member that corresponds to the position of the variable member 1006 that may be fixed anywhere along the slot 1008 of the traveling member 1010. The force engine 1500 may me configured to allow the torsion spring 1044 (and possible the spiral pulley 1042) to be mounted remotely from the traveling member 1010 and interconnected components to reduce the local size or space of footprint while maximizing the potential capacity. In various embodiments, the force engine 1500 and incorporating system do not require a footprint on the floor or ground.

Figure 16:
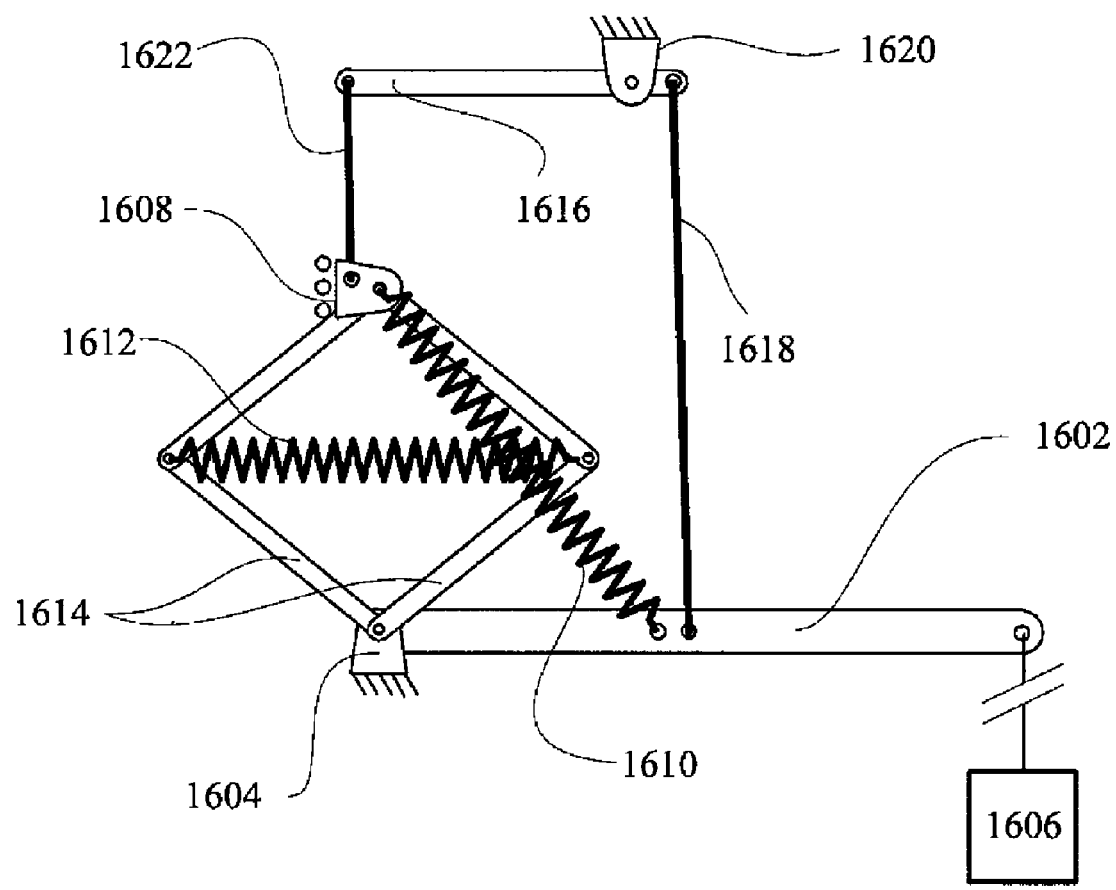

FIG. 16 illustrates a force engine 1600. In this embodiment, a traveling member 1602 is hingedly attached to a base 1604 on one end and a load 1606, either directly or indirectly at the other end. An energy reservoir 1610 connects to the traveling member 1602 at one end and to a variable member 1608 at the other. During adjust mode, the variable member 1608 may be moved vertically. Displacing the variable member 1608 upward increases the lifting force of the force engine 1600. However, this displacement requires a large input of energy. A second energy reservoir 1612 is used to provide the energy needed for this adjustment. A parallelogram linkage 1614 is hingedly connected to the variable member 1608 at one end and the base 1604 at the other end. The energy reservoir 1610 connects between mid-points of the parallelogram linkage 1614. The spring rates of the springs may be selected so that the variable member 1608 may be adjusted with little or no change in the energy state of the energy reservoirs 1610 and 1612. In one embodiment, the energy reservoirs 1610 and 1612 are tension springs.

To accomplish automatic adjustment, a linkage is used to couple displacement of the load 1606 to displacement of the variable member 1608 during the adjusting mode with the variable member 1608 being biased toward the minimum position. In one embodiment, the coupling is accomplished by connecting traveling member 1602 to an end of the amplifying link 1616 by a link 1618. The amplifying link 1616 hingedly rotates about the base 1620. The other end of the amplifying link is connected to a variable member 1608 by a link 1622. A small downward displacement of the load 1606 leads to a large upward displacement in the variable member 1608. A variety of other means of coupling the variable member 1608 to the load 1606 may be used as previously described.

In one embodiment, biasing of the variable member toward the minimum capacity position is accomplished by adding a biasing element attached to the variable member, parallelogram linkage, or coupling linkage to bias the variable member toward the minimum capacity position. In another embodiment, the spring rates of the energy reservoirs 1610 and 1612 are selected so that the downward force of the main energy reservoir 1610 on the variable member 1608 is slightly greater than the upward force acting on the variable member 1608 from the parallelogram linkage 1614 due to energy reservoir 1612. In another embodiment, linkage lengths and the path of the variable member are changed to accomplish a biasing effect of the variable member toward a minimum position.

As with other embodiments, the variable member 1608 may be fixed in position during the operating mode and released during the adjust mode utilizing the systems and methods similar to those previously described. The traveling member 1602, or load 1606 may also be coupled to the variable member during adjust mode, and decoupled from the variable member during operating mode.

The load 1606 is either directly attached to the traveling member 1602, or through some additional linkage. In one embodiment, the load 1606 is applied to a second rotating linkage which is pivotally connected to the free end of the traveling member at a first end, and vertically slidably constrained to ground at the other end, so that the load 1606 displaces vertically.

Figure 17:
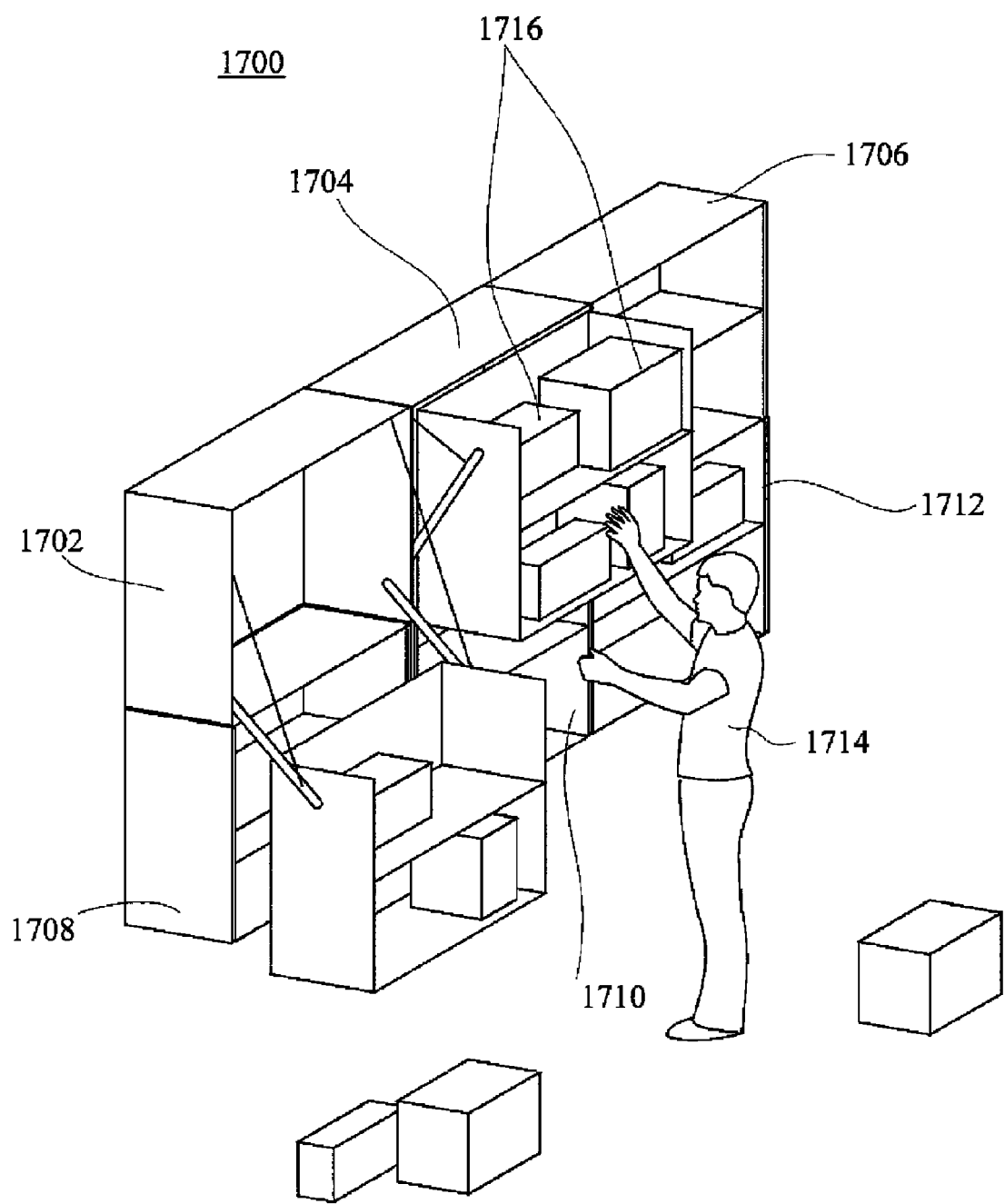
FIG. 17 is a pictorial representation of a storage environment in accordance with an illustrative embodiment.

FIG. 17 is a pictorial representation of a storage environment 1700 including auto-balancing cabinets 1702, 1704, and 1706 in accordance with an illustrative embodiment. The storage environment 1700 of FIG. 17 illustrates one configuration of multiple auto-balancing cabinets 1702, 1704, and 1706 as well as cabinets 1708, 1710, and 1712. The cabinets 1708, 1710, and 1712 are standard cabinets that are affixed to a wall and do not include the auto-adjust. The number of horizontal or vertical cabinets comprising the embodiment of the cabinet array is configurable by the user's needs or application. Cabinets 1708, 1710, and 1712 may be replaced by auto-balancing cabinets that may be adjacently positioned as shown. As shown, the auto-balancing cabinets 1702, 1704, and 1706 may be positioned adjacent to one another while still maintaining functionality. As an example, a user 1714 may access the auto-balancing cabinets 1704 loaded with goods 1716 without touching, interfering with or damaging the cabinet 1710 below or cabinets 1702 and 1706 to the sides of the auto-balancing cabinet 17104. In particular, the auto-balancing cabinet 1704 may lift the goods 1716 out and over the existing cabinetry or objects below when lowering the goods 1716, such as the cabinet 1710. The auto-balancing cabinets 1702, 1704, and 1706 may utilize any of the previously described force engines to drive the motion and balancing force provided to the user 1714 in lowering and lifting the goods 1716.

The storage environment 1700 as shown reduces the footprint required to store goods. In one embodiment, the auto-balancing cabinets 1702, 1704, and 1706 may lift a load of 150 lbs over 30 inches of vertical travel with minimal input from the user. The minimum and maximum weight and vertical travel ranges are a parameter of configuration that may be customized for each user application and during manufacturing. The auto-balancing cabinets 1702, 1704, and 1706 may be configured to automatically configure themselves for the weight placed in the storage bin and then adjust the counterbalance force provided by the auto-balancing or manual force engine to supply the energy needed to substantially lift or lower the auto-balancing cabinets 1702, 1704, and 1706

The auto-balancing cabinets 1702, 1704, and 1706 provide many advantages. For example, the auto-balancing cabinets 1702, 1704, and 1706 may function as both a scale and energy storage device, which stores sufficient energy to lift and lower a maximum load through a given displacement that include both horizontal and vertical components as shown by the auto balancing cabinet 1704 that is in motion. After configuring itself to the load or during the adjusting process, the auto-balancing engine is transformed to provide the amount of energy required to assist in substantially lifting or lowering the load. In particular, the force engines of each of the auto-balancing cabinets 1702, 1704, and 1706 balance the weight of the load when a carriage is lowered and provide a substantial portion of the lifting force required to raise the carriage. For example, the auto-balancing cabinets 1702, 1704, and 1706 may adjust between applying a minimum force and a maximum force corresponding to a specified maximum load and a minimum load (i.e. empty), respectively. Any of the previously described force engines may be utilized by the auto-balancing cabinets 1702, 1704, and 1706.

Auto-balancing cabinet 1702 is shown as fully extended in a load/unload position. The auto-balancing cabinet 1702 extends past the cabinet 1708 without touching, damaging, or otherwise interfering with the cabinet 1708. The auto-balancing cabinet 1702 is shown in an adjusting mode during which the user 1714 may add or remove goods thereby changing the load. The auto-balancing cabinet 1702 adjusts to the load (whether increasing or decreasing) so that the user 1714 provides minimal user force to raise and subsequently lower the carriage of the auto-balancing cabinet. As illustrated, the goods 1716 are much more accessible when the auto-balancing cabinet 1702 is fully extended.

The auto-balancing cabinet 1704 is shown in an operating mode during which the auto-balancing cabinet 1704 is providing a counterbalancing force so that the user 1714 may provide minimal force to raise or lower the goods 1716 to a more accessible height, such as that shown for auto-balancing cabinet 1702.

In an alternative embodiment, the auto-balancing cabinets may also be operable to lift goods to users by positioning the force engines and lifting components of the auto-balancing cabinets. As shown the multiple auto-balancing cabinets 1702, 1704, and 1706 and cabinets 1708, 1710, and 1712 may be aligned or stacked horizontally and vertically without interfering with the operation of each independent unit.

Figure 18:
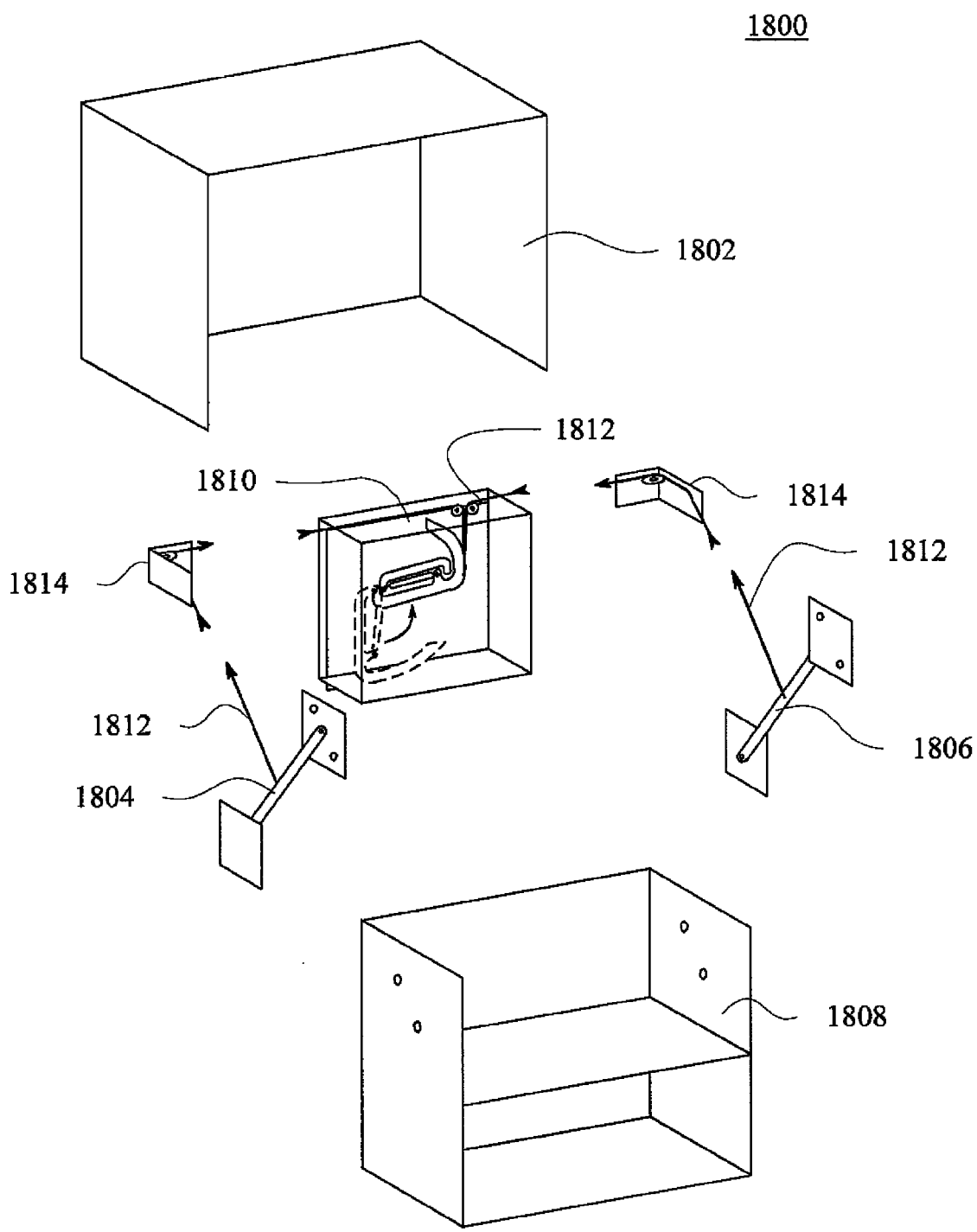
FIG. 18 is an exploded view of systems of an auto-balancing cabinet 1800 in accordance with an illustrative embodiment.

FIG. 18 is an exploded view of systems of an auto-balancing cabinet 1800 in accordance with an illustrative embodiment. The auto-balancing cabinet 1800 is one implementation of the auto-balancing cabinets 1702, 1704, and 1706 of FIG. 1700. The auto-balancing cabinet 1800 may be assembled in any number of configurations to meet the needs of a user and environmental conditions of a storage environment. In particular, the auto-balancing cabinet 1800 may include a number of systems that are interchangeable for different configurations of the described auto-balancing cabinets and storage systems. For example, the auto-balancing cabinet 1800 utilizes a pulley and cable configuration. The auto-balancing cabinet 1800 may be used to access and utilize out-of-reach storage areas, such as walls of garages, small apartments with limited floor space, and other similar structures. The auto-balancing cabinet 1800 may be particularly useful for individuals, such as persons with disabilities, children, and shorter individuals that are unable to reach or lift objects to high places. An alternative embodiment may be utilized to lift goods from a lower position, such as near the ground, up to a level more easily accessed by a user. The force engine may be positioned to provide the lift forces for lift arms that raise the goods or load. The adjusting mode similar occurs during a fully-extend or lifted positioned (rather than a lowered position).

In one embodiment, the auto-balancing cabinet 1800 includes a case 1802. The case 1802 is a frame enclosing the mechanical components of the auto-balancing cabinet 1800 used to counter-balance the stored goods and assist in lifting and lowering the goods. The case or a wall or other structure to which the case is connected or attached may act as a ground to many of the components of the auto-balancing cabinet. The case 1802 is secured to a support structure, such as a wall, metal framework, studs or other similar support elements. Various embodiments do not utilize the case 1802 to further reduce the materials and space required for the auto-balancing cabinet 1800. The case 1802 may include mounting holes or slots, rails, or other components known in the art on a back, top, or support-facing side for allowing the case 1802 to be connected to a wall or support to secure the entire auto-balancing cabinet 1800.

The auto-balancing cabinet 1800 further includes a lift guide system for guiding the carriage. In one embodiment this includes lift arms 1804 and 1806. The lift arms 1804 and 1806 are connected to a carriage 1808. The lift arms 1804 and 1806 lift and raise the carriage 1808 to make goods stored in the carriage 1808 more accessible to a user. The lift arms 1804 and 1806 may utilize any number of configurations as is further described in FIG. 19. The lift arms 1804 and 1806 may be configured to include a four-bar linkage or any of the embodiments of FIG. 19. In another configuration the carriage is guided up and down by rollers. In one embodiment the lift arms 1804 may attach to the side of the carriage 1808. In another embodiment, the lift arms 1804 may attach to the back of the 1808 carriage.

The carriage 1808 stores goods during operation of the auto-balancing cabinet 1800. The carriage 1808 may be any combination of shelves, drawers, cupboards, and racks. The engine or engine lift arm configuration may be designed to provide automatic balancing to existing cabinetry. In one embodiment, the carriage 1808 is user customizable using clips, holes, dowels, fasteners, rails, and other similar elements known in the art. The carriage 1808 may also be configured to include or incorporate nested containers, and other proprietary storage systems or components. The carriage 1808 may include a handle or grip for facilitating the user in pulling down or pushing up (or pushing down and pulling up) the carriage 1808. In one embodiment, the carriage may be a cabinet with prefabricated sides that allows the cabinet to expand in a width and height direction for customized installation and to reduce manufacturing costs for the auto-balancing cabinet.

The lift arms 1804 and 1806 are driven by a force engine 1810. The force engine 1810 may include any number of configurations based on the needs of the user and available storage environment. The force engine 1810 provides the forces to the lift arms 1804 and 1806 for lifting the carriage 1808. The force engine 1810 may utilize one or more energy reservoirs. The most common types of energy storage reservoirs and corresponding force engines are masses acting against gravity, springs of elastically deforming solids that are deflected, and springs made by compressing gasses.

For example, the auto-balancing cabinet 1800 may utilize an auto-adjust force engine, a manual adjust force engine, a fixed balancing force engine using an energy reservoir, an electric engine, and a hydraulic engine. The auto-balancing cabinets of the illustrative embodiments are configured, such that any of the described force engines may be utilized interchangeably without special configuration of the auto-balancing cabinet.

In one embodiment, the force engine 1810 provides the balancing force through cables 1812 and pulleys 1814. Alternatively, the auto-balancing cabinet 1800 may utilize belts, chains, levers, rods, linkages, or other components for transferring forces throughout the auto-balancing cabinet 1800 to assist the user in lowering and raising the carriage 1808 to access the stored goods. The pulleys 1814 are configured to directionally transfer the forces through the cables 1812. In one embodiment, the cables 1812 are directly connected to the lift arms 1804 and 1806 for lowering and raising the lift arms 1804 as well as stabilizing the lift arms 1804 and 1806 and carriage. The manner in which the cables 1812 and pulleys 1814 are coupled to the force engine 1810 and lift arms 1804 and 1806 may provide a force-displacement transformation that allows the carriage 1808 to be used over a wider range of vertical and horizontal motion with improved performance.

In another embodiment, the carriage 1808 is provided with a balancing force from the engine with chains, levers, rods, linkages, or other components for transferring forces. The carriage 1808 may be guided up and down using rollers, wheels, linear glides, slides, or tracks.

In one embodiment, the force engine 1810, lift arms 1804 and 1806, cables 1812 and pulleys 1814 may be integrated with the case 1802 so that the components are more easily installed. In addition, the auto-balancing cabinet 1800 may be a modular unit that is easily installed. The case 1802 may also include doors for opening and accessing the carriage 1808.

In another embodiment, one or more force engines 1810 may directly integrated or connected to the lift arms 1804 and 1806. For example, an engine and lift arm may be incorporated into either side of the auto-balancing cabinet 1800. Each engine and lift arm may be configured to operate independently or one may be a master mechanism with the other side being a slave lift mechanisms. The movement of the carriage 1808 may be synchronized between a single force engine 1810 or multiple engines and integrated lift arms.

In another embodiment, the engine and lift arms may all be located on the back of the carriage. In one embodiment, force engines 1810 and lift arms 1804 and 1806 can be affixed to existing cabinetry, providing the counterbalance or counterweight methods by utilizing users existing cabinetry. For example, the force engine may be integrated with a rear portion of the cabinet, the lift arms and other linkage may be connected to or integrated with the sides, or back of the cabinet, and the carriage may be configured to extend from the cabinet for access by a user.

FIG. 19 is a pictorial representation of lift arm systems for the auto-balancing cabinet in accordance with illustrative embodiments. In various embodiments, the auto-balancing cabinet may utilize lift arms 1902, 1904, 1906, pulley system 1908, or lift arms 1910

Lift arms 1902, 1904, and 1910 may utilize a four-bar linkage, double cable, or other means of stabilizing the carriage as it displaced in addition to the shown pulley and cable used provide the balancing force to the lift mechanism. The angle and direction that the lift arm systems 1900 extend the carriage depend upon each of the respective configurations. In one embodiment, the lift arm 1902 is not configured to have an auto-adjust system directly below because the carriage would interfere or hit the cabinet below. The lift arm system 1902 may be used to accomplish as displacement path that drops out and down. The lift arm system 1904 is utilized over a greater rotational range so that the carriage will displace out and over content or other cabinetry located below it before displacing downward.

Lift arms 1906 and 1908 are operable to lift the carriage vertically. Lift arm 1906 utilizes a scissor configuration for the linkage arms. Lift system 1906 displaces directly downward by using a lift arm attached to a base plate, with a second lift arm inverted and attached to the first lift arm. Pulley system 1908 may be utilized to lower and raise the carriage vertically utilizing a pulley and cable configuration. Pulley system 1908 may additionally include slides, wheels, rails, or other components to secure or stabilize the carriage while being raised or lowered. This provides the same kinematic transformation as a rotating lift arm but displaces directly downward. Lift System 1908 provides a vertical displacement with no kinematic transformation.

The lift arm 1910 is operable to assist a user in lifting a carriage from a lower position to a higher position. For example, some users have difficult bending or reaching down very far. A handle connected to the carriage may allow a user to lift a carriage and stored goods up to an accessible height using very little force before pushing the carriage back into a rest or storage position below.

Figure 20:
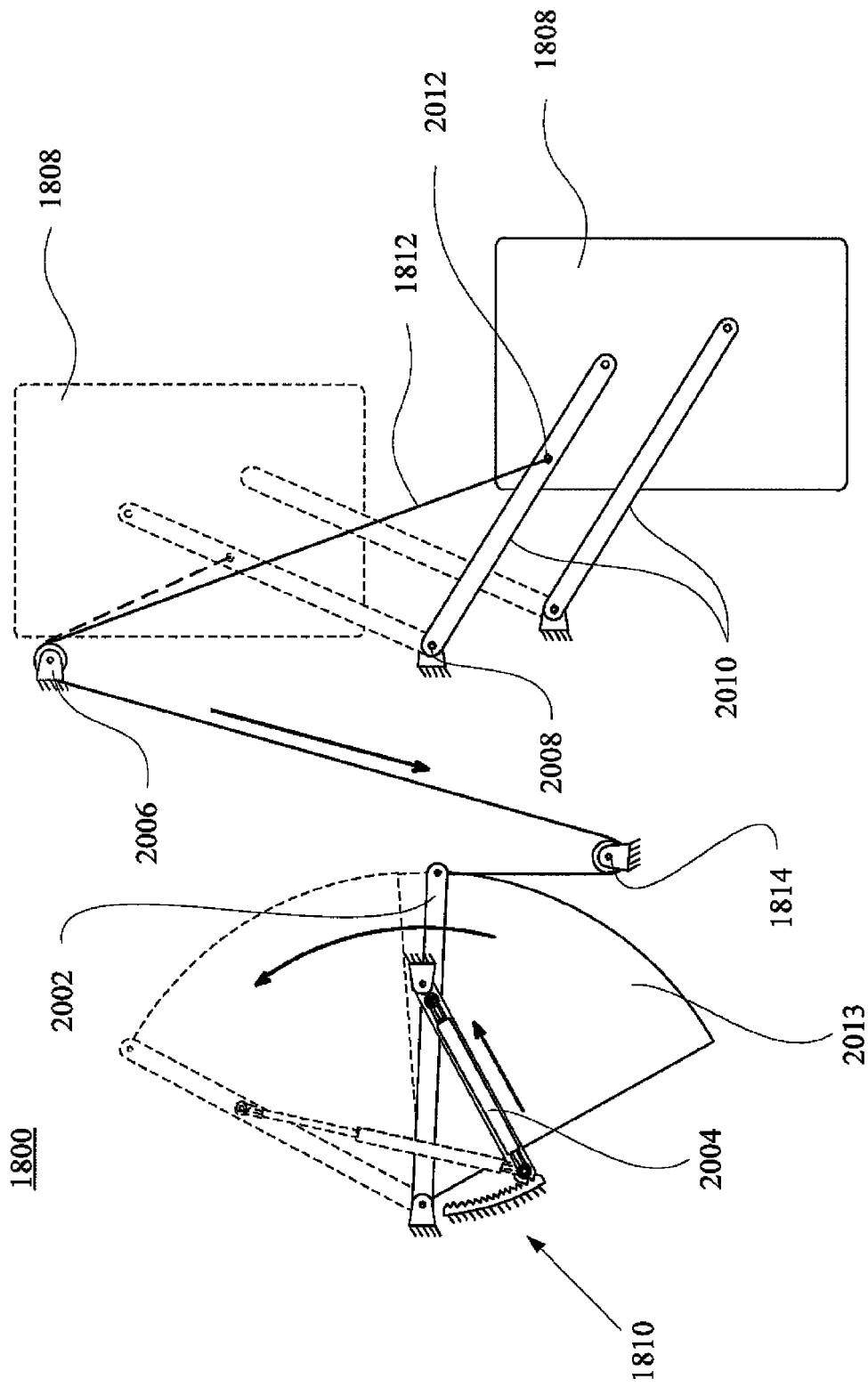
FIG. 20 is a single dimensional view of portions of the auto-balancing cabinet of FIG. 18 in accordance with an illustrative embodiment.

FIG. 20 is a single dimensional view of portions of the auto-balancing cabinet 1800 of FIG. 18 in accordance with an illustrative embodiment. FIG. 20 shows a flattened view of portions of the auto-balancing cabinet 1800 for better explaining the interconnections. Referring now to FIGS. 18 and 20, a traveling member 2002 is connected to the cable 1812. The cable 1812 runs over a quarter pulley 1814 coupled to the traveling member. The quarter pulley may be of constant radius, or may vary in radius. The traveling member 2002 traces out an arced path when raising and lowering the carriage 1808. Positioning the engine 1810 at the back or top of the auto-balancing cabinet 1800 provides a greater range of motion with less user input required for the traveling member 2002 and for lifting the carriage 1808. The balancing force applied by the gas spring 2004 to the traveling member 2002 is mechanically transferred and redirected through the cable 1812 which may be included on both sides of the auto-balancing cabinet 1800. In one embodiment, the pulleys 1814 and 2006 may include any number of pulleys for translating the force through directional changes that may include one or more corners.

In one embodiment, a lift pulley 2006 is positioned directly above a base 2008 of lift arms 2010. This allows both positive and negative torque to be applied to the lift arms 2010 once the lift arm passes a 90° angle.

The lift force is applied to the carriage 1808 by at least the lift arms 2010 which may be connected to the traveling member 2002 through the cables 1812 and pulleys 1814.

As shown, the mechanical advantage provided by the linkage is negative. When the lift arms 2010 are in a vertical position (90°) pointing toward the pulley 216, the torque is zero. As the lift arms 2010 passes 90° the cable 1812 is taken up again and the torque applied by the auto-balancing cabinet 1800 is negative.

The relative positioning of the base 2008, the lift pulley 2006, and a connection point 2012 may be utilized to establish the mechanical advantage provided by the auto-balancing cabinet 1800. The positioning of the base 2008 of the lift arms 2010 and the connection point 2012 of the cable 1812 to the lift arms 2010 allows the lift arms 2010 to rotate past 90° in order to lift the carriage up and over the space below the case 1802 and auto-balancing cabinet 1800. The connection point of the cable to the lift arms 2010 allows them to pass under the lift pulley 2006. In one embodiment, the lift arms 2010 may be integrated with a cabinet or portion of the auto-balancing cabinet 1800 below. For example, the lift arms 2010 may be integrated with side portions of a lower portion or additional cabinet connected below the auto-balancing cabinet 1800 as further shown in FIG. 21.

Figure 21:
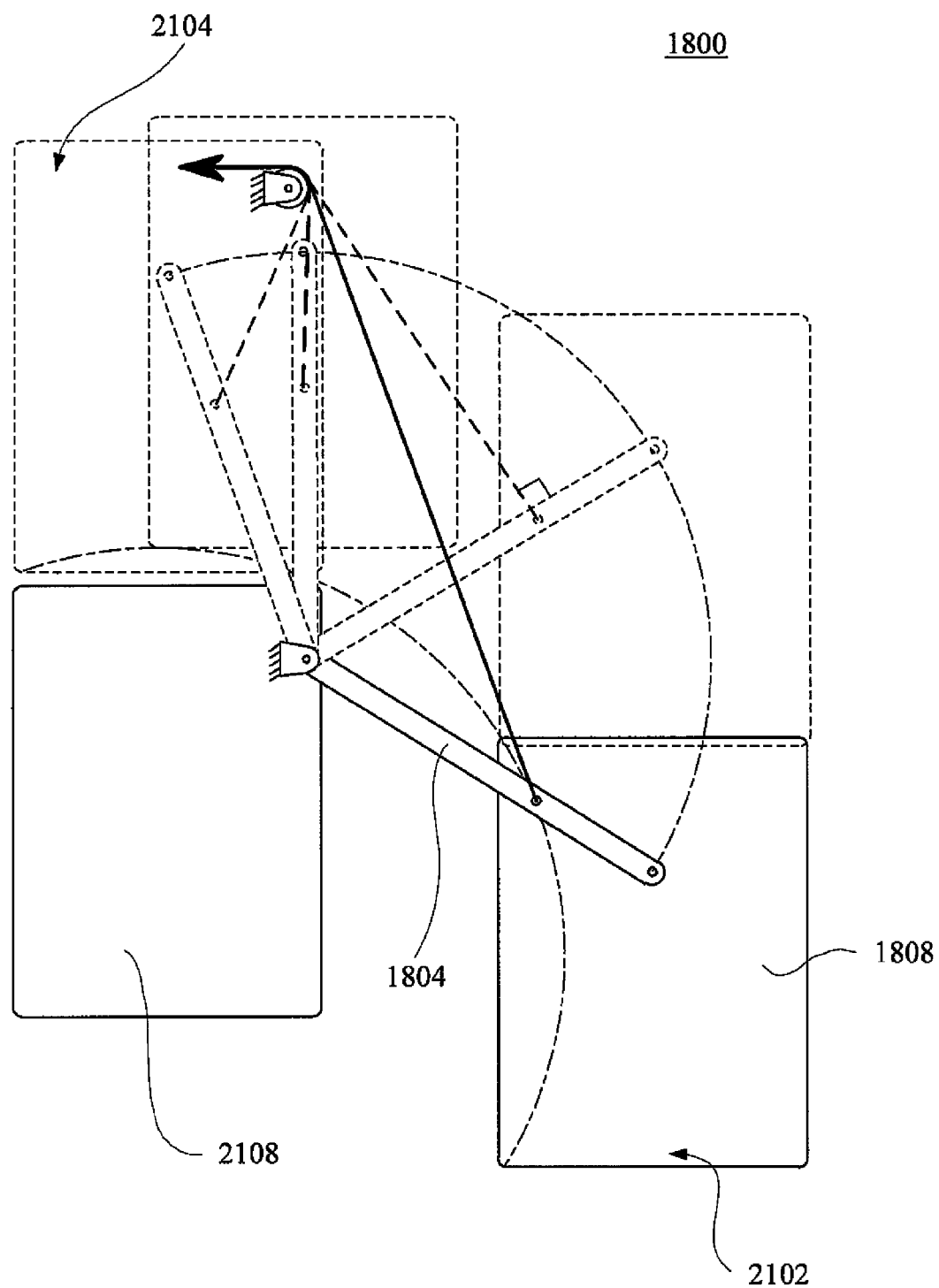
FIG. 21 is a pictorial representation of the auto-balancing cabinet showing a full range of motion in accordance with an illustrative embodiment.

FIG. 21 is a pictorial representation of the auto-balancing cabinet 1800 showing a full range of motion in accordance with an illustrative embodiment. The range of motion shown for the carriage 1808 illustrates one potential displacement path. The carriage 1808 rotates between an adjusting position 2102 (i.e. open and accessible or loading/unloading position) and a stored position 2104 (or stored position). As shown a lift arm 1804 is operable to rotate over an extended range including past a vertical position or 90° angle. The auto-balancing cabinet 1800 is operable to lift the carriage 1808 over the cabinet 2108 without interference. As shown the lift arm 1804 and corresponding components are integrated with the sides of the cabinet 2108.

Figure 22:
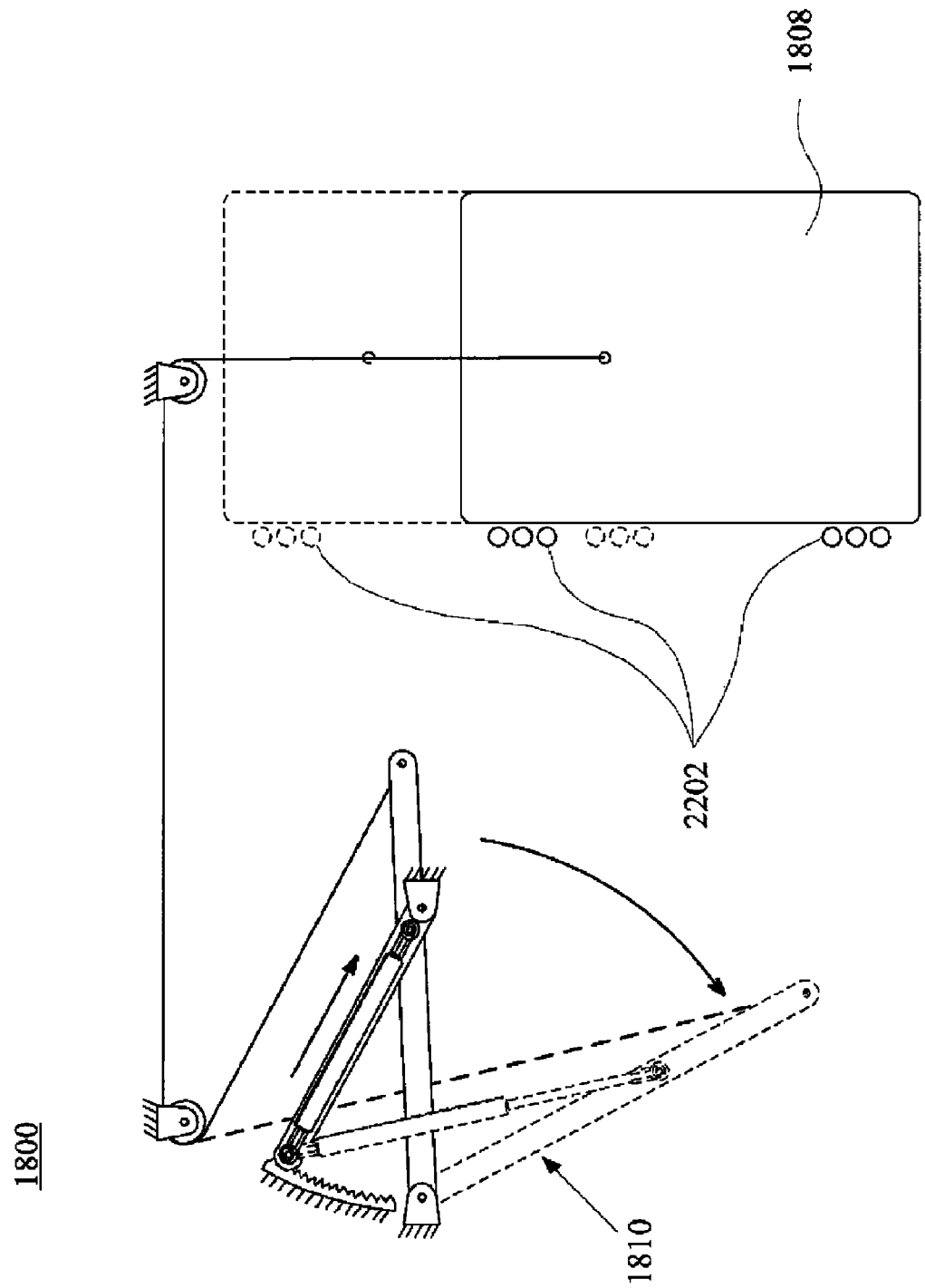
FIG. 22 is a pictorial representation of the auto-balancing cabinet utilizing a vertical range of motion in accordance with an illustrative embodiment.

FIG. 22 is a pictorial representation of the auto-balancing cabinet 1800 utilizing a vertical range of motion in accordance with an illustrative embodiment. The carriage 1808 is configured to be raised and lowered vertically as driven by the force engine 1810. The carriage 1808 may utilize rollers 2202, wheels, tracks, slides, or linear glides to guide and stabilize the carriage 1808 during raising and lowering. As a result, the force engine 1810 may conserve more space and provided a vertical drop-down configuration.

Figure 23:
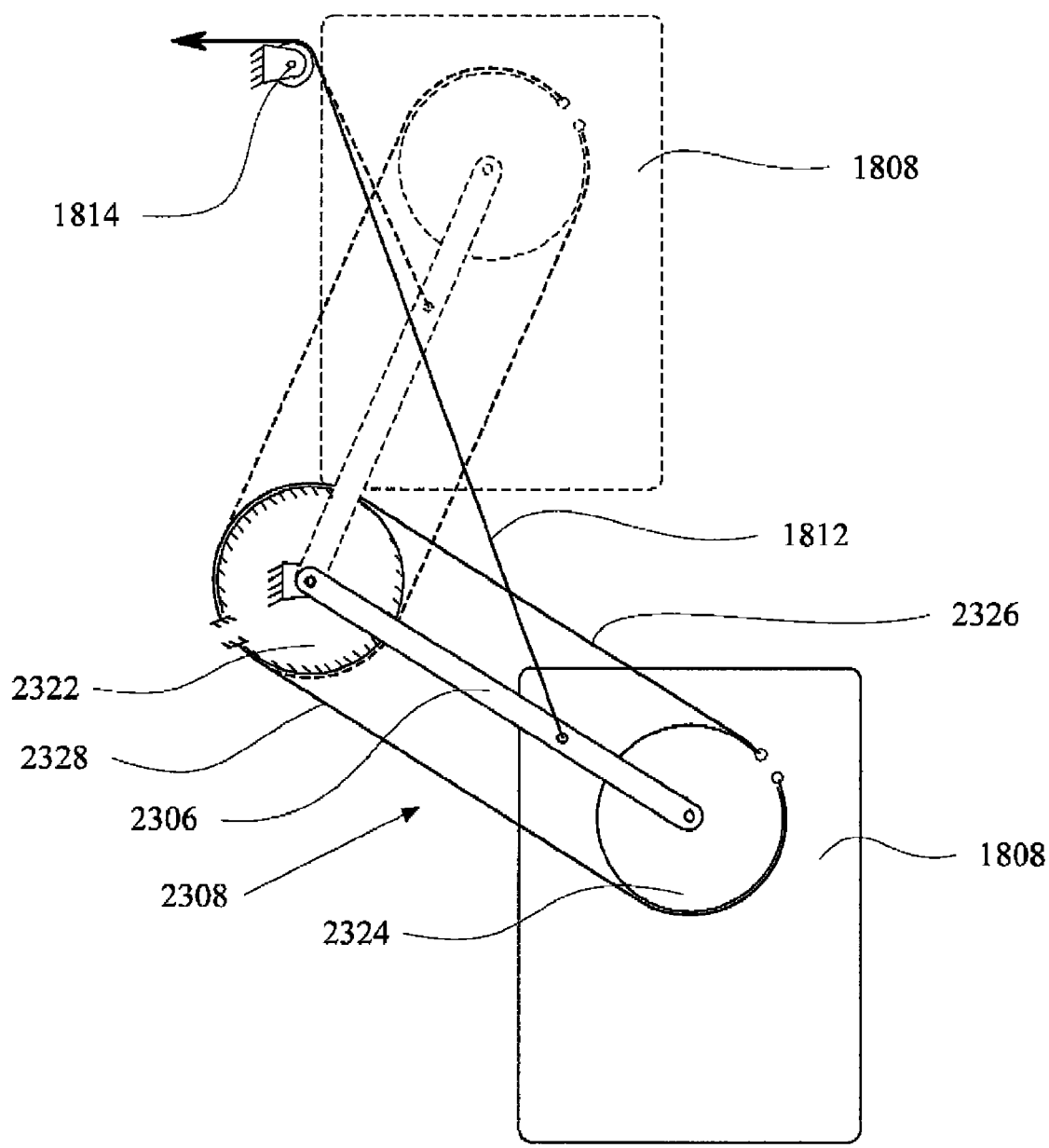
FIG. 23 is a pictorial representation of a dual pulley lift arms in accordance with an illustrative embodiment.

FIG. 23 is a pictorial representation of a dual pulley lift arms 2300 in accordance with an illustrative embodiment. The lift arm 2306 may utilize a single arm or linkage. However, the linkage 2308 may include pulleys 2322 rigidly attached to ground and 2324 rigidly attached to the carriage connected by cables 2326 and 2328. Any flexible tension bearing member such as a cable, roller chain, cord, or rope may also be used. As the lift arm 2306 rotates the cables are not allowed to slip on the pulleys. In one embodiment the one end of the cable is attached to the ground pulley and the other end attached to the carriage pulley. The pulleys 2322 and 2324 are linked so that the carriage 1808 remains aligned at a constant angle when moving between positions. The pulleys may also be linked to achieve a desired and controlled rotation in the carriage 1808 during rotation. In other words, the bottom of the carriage 1808 remains horizontal and flat for keeping the stored goods flat during motion. Multiple cables 2326 and 2328 are utilized to ensure that one cable is always in tension during the motion of the carriage up or down.

Figure 24:
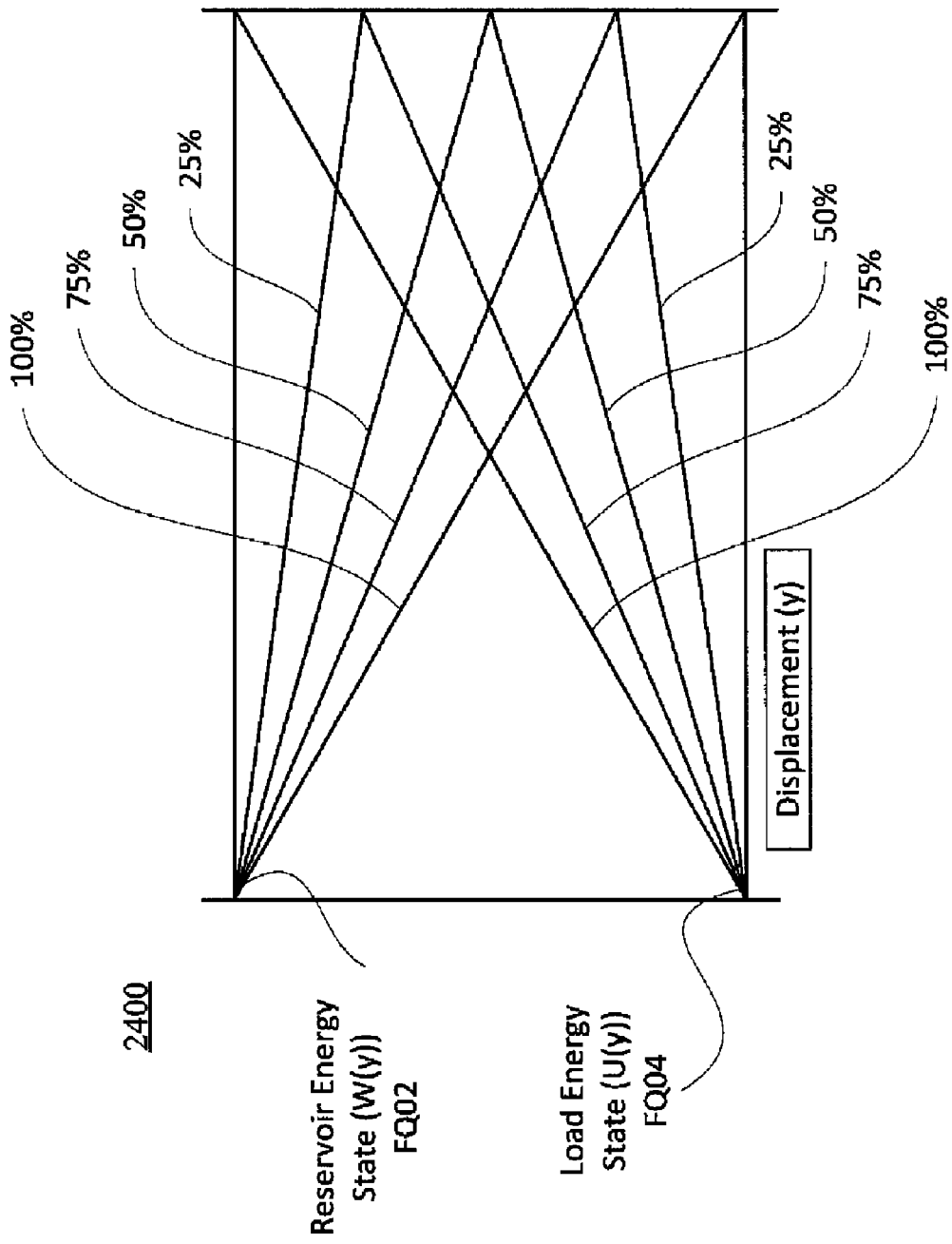
FIG. 24 is a graph illustrating energy transfer in an auto-balancing system in accordance with an illustrative embodiment.

FIG. 24 is a graph 2400 illustrating energy transfer in an auto-balancing system in accordance with an illustrative embodiment. The graph 2400 illustrates the transfer of energy between reservoir energy (i.e. spring or mass) and load energy (i.e. the energy of stored goods). The graph 2400 illustrates the transfer of energy from the energy reservoir to the load over a known displacement expressed in terms of percentages levels of reservoir energy and load energy. The energy change in the auto-balancing system as illustrated by graph 240 is approximately proportional to the displacement of the load. In particular, the during the weighing mode the linkage of the auto-balancing engine is configured so that when the auto-balancing engine is changed to lift mode, the stored energy (i.e. the spring energy) is released at approximately the same rate the stored energy is used to move the load.

Figure 25:
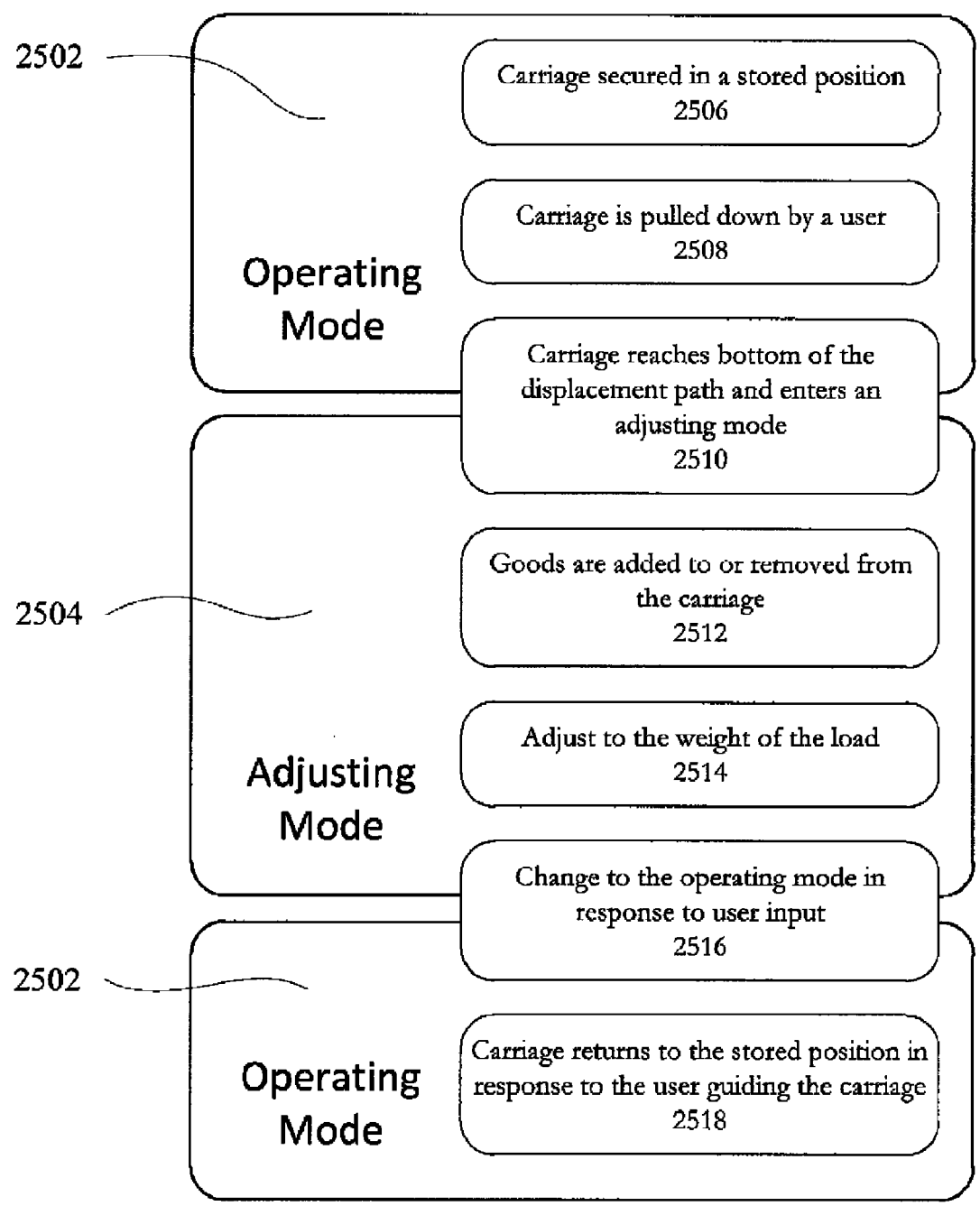
FIG. 25 is a flowchart of a process for operating an auto-balancing system in accordance with an illustrative embodiment.

FIG. 25 is a flowchart of a process for operating an automatically-balancing assisted storage system in accordance with an illustrative embodiment. The process of FIG. 25-27 may be implemented by any number of devices or systems that incorporate the force engines, linkages, and auto-balancing components, and systems as herein described. For example, the auto-balancing system may be integrated as a cabinet or tool mount, or other similar device. Examples from the cabinet are provided herein for purposes of simplicity. Likewise, the cabinet is described in terms of an auto-balancing system that extends down; however, the cabinet may also be operable to extend upwards to a user and the process of FIG. 25 is thus equally applicable to that process.

The automatic-balancing system may operate in at least two modes including an operating mode 2502 and an adjusting mode 2504. The process may begin with a carriage secured in a stored position (step 2506). The stored position may be a closed position. In one embodiment, the cabinet may be secured by doors that are required to be opened to access the cabinet even in the stored position.

Next, the carriage is pulled down by a user (step 2508). The carriage path may be down and out, straight down, or down and then out. The carriage may include a handle, straps, grips, or other access components that allow a user to apply the force to the carriage. The force required by the user may depend on the motion of the carriage. For example, the user may be required to pull the carriage horizontally initially to overcome the equilibrium of the carriage before supporting the carriage with an upward force as the carriage drops down to an accessible height. During step 2508, the auto-balancing system provides a substantial balancing force, such that the user input is minimal. The user is not fully supporting the weight of the goods or load in the carriage. For example, the force engine may provide 90% of the force, such that the user is only supporting or providing a force equivalent to 10% of the weight. In another embodiment, the user may only be required to provide 5%, 10%, or 15% of the weight when lifting or lowering the carriage. In one embodiment, the user may only be required to provide 10-30 pounds of lifting force or approximately 2-30% of the weight corresponding to the load. These numbers may vary for commercial applications or tools. As a result, minimal user input is required with the auto-balancing system providing a substantial amount of the force required to move the carriage through the displacement path. In other embodiments, the user may actually be required to provide a downward force to pull the carriage to a loading/unloading or accessible position or an upward force to push the carriage to the stored position.

Next, the carriage reaches a bottom of the displacement path and enters an adjusting mode (step 2510) and the auto-balancing system changes to the adjusting mode 2504. The bottom of the displacement path or stroke represents the full extension of the carriage provided by the corresponding lift arms or carriage bearing linkage. As previously describe, the motion, curve or line defining the displacement path of the carriage may depend on the type and configuration of the lift arms. At rest or static equilibrium for the auto-balancing system, no forces are required from the user to support the carriage.

Next, the goods are added to or removed from the carriage (step 2512). The goods are the load imposed upon the carriage. In the embodiments, the carriage is more accessible at the end of the displacement path than at the beginning of the path to all users and particularly children, elderly persons, and individuals with disabilities.

Next, the auto-balancing system adjusts to the weight of the load (step 2514). The force engine may automatically or manually adjust. In one embodiment the force engine automatically enters an adjusting mode as the carriage approaches the bottom of the displacement range or as goods are added or removed from the carriage. In another embodiment, the user may push up or pull down on the carriage, pull a handle, push a button, press a lever or pull a strap to engage or initiate the operating mode 2502 or the adjusting mode 2504.

Alternatively, any number of dials, knobs, levers, slides, or other mechanisms may be utilized to manually set the force provided to the auto-balancing system by the force engine. For example, an easily turned dial may include a numeric indication of the force (associated with a weight of the goods) provided by the force engine to counterbalance the load. In one embodiment, the auto-balancing system may include analog or digital read outs that indicate the weight of the load as well as the force applied by the force engine.

Next, the auto-balancing system changes to the operating mode 2502 in response to user input (step 2516). The user input may be provided by pulling twisting, rotating or otherwise interacting with a handle, or other common physical interface known in the art. The user input may be the user providing a force against the carriage to return the carriage to the stored position. In another embodiment, the selection described for engaging the adjusting mode 2504 may be utilized to engage the operating mode 2502. The process ends with the carriage returning to the stored position in response to the user guiding the carriage (step 2518). As before, the user may only be required to provide a minimal force, or small fraction, portion, or percentage of the weight corresponding to the load. For example, for a 100 pound load, the user may only be required to provide 10 pounds of force to return the carriage to the stored position based on the assistance from the counterbalance force applied by the force engine to the carriage.

It is important to note that the modes of operation in the force engine and counterbalancing systems overlap briefly during transitions between the variable member being locked and/or the traveling member being locked. The overlapping modes prevent the force engine from reaching points of instability where the force engine may fail when transitioning back and forth between modes.

Figure 26:
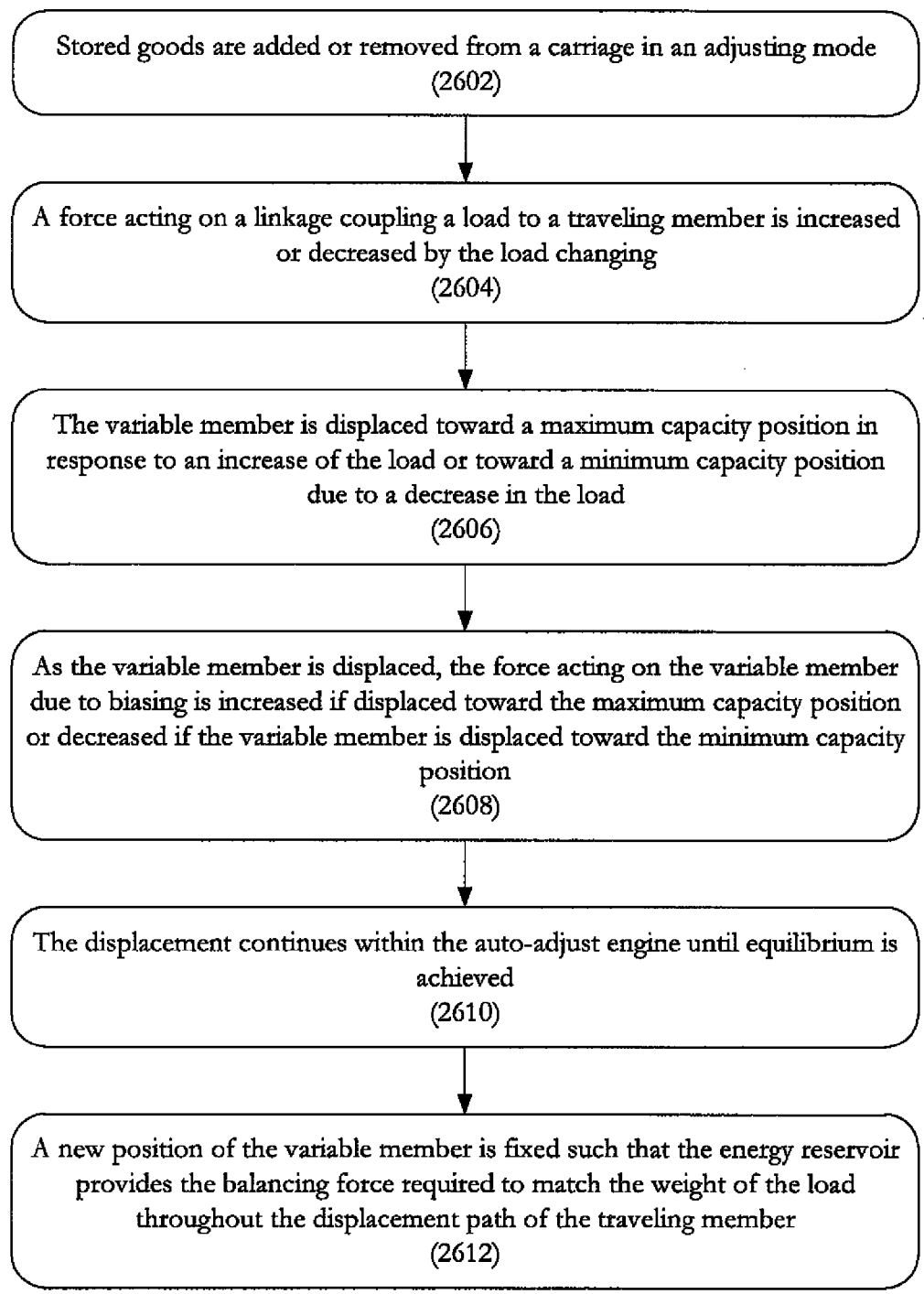
FIG. 26 is a flowchart of a process for configuring an auto-adjust engine in accordance with an illustrative embodiment.

FIG. 26 is a flowchart of a process for configuring an auto-adjust engine in accordance with an illustrative embodiment. The process of FIG. 26 is applicable to many of embodiments of the force engines shown and described herein. The process of FIG. of FIG. 26 may begin with stored goods being added or removed from a carriage in an adjusting mode (step 2602). The stored goods may represent the load imposed on the force engine. Next, a force acting on a linkage coupling a load to a traveling member is increased or decreased by the load changing (step 2604).

A variable member is displaced toward a maximum capacity position in response to an increase of the load or to toward a minimum capacity position in response to a decrease in the load (step 2606). As the variable member is displaced, the force acting on the variable member due to biasing is increased if displaced toward the maximum capacity position or decreased if the variable member is displaced toward the minimum capacity position (step 2608).

Next, the displacement continues within the auto-adjust engine until equilibrium is achieved (step 2610). A new position of the variable member is fixed such that the energy reservoir provides the balancing force required to match the weight of the load throughout the displacement path of the traveling member (step 2612).

Figure 27:
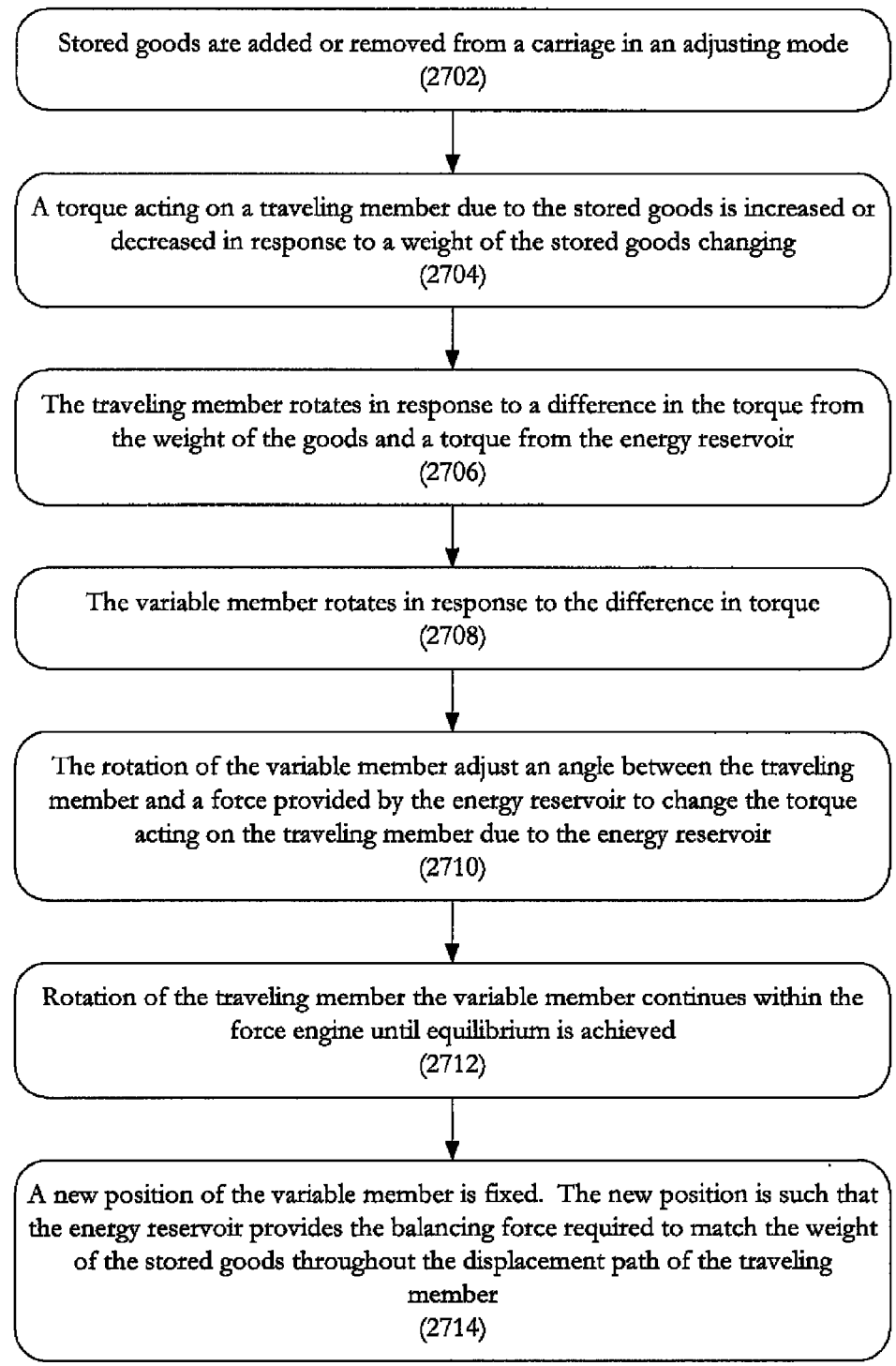
FIG. 27 is a flowchart of a process for adjusting the auto-balancing system in accordance with an illustrative embodiment.

FIG. 27 is a flowchart of a process for adjusting the auto-balancing system in accordance with an illustrative embodiment. The flowchart of FIG. 27 may be applied to the force engine 100 of FIG. 1. The process of FIG. 27 may begin with stored goods being added or removed from a carriage in an adjusting mode (step 2702). A torque acting on a traveling member due to the stored goods is increased or decreased in response to a weight of the stored goods changing (step 2704).

Next, the traveling member rotates in response to a difference in the torque between the weight of the goods and a torque from an energy reservoir (step 2706). Next, the variable member rotates due to the difference in torque (step 2708). The rotation of the variable member adjusts an angle between the traveling member and a force provided by an energy reservoir to change the torque acting on the traveling member due to the energy reservoir (step 2710). The variable member may rotate in response to the coupling between the variable member and the traveling member. The rotation of the variable member adjusts the operating relationship of the energy reservoir and the traveling member, changing the force applied by energy reservoir.

Rotation of the traveling member and the variable member continues within the force engine until equilibrium is achieved (2712). The rotation may continue due to the coupling between the members. The increase or decrease of the angle of the variable member increases or decreases the counterbalance force provided by the energy reservoir to correspond to the weight of the stored goods.

Next, a new position of the variable member is fixed. The new position is such that the energy reservoir provides the balancing force required to match the weight of the stored goods through a displacement path of the traveling member (step 2714).

The included description, illustrative embodiments, engines, lift systems, pulley systems, and components as well as those included in the priority applications may be combined in any number of combinations and configurations. The description of the present invention has been presented for purposes of illustration and description, and is not intended to be exhaustive or limited to the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed:

1. A force engine for a storage system, comprising:
  a frame;
  a traveling member, the traveling member comprising a first end with a first pivot point connected to the frame, a second end that is opposite the first end, and a load point;
  a variable member, the variable member comprising a first end with a second pivot point connected to the frame, and a second end;
  an energy reservoir, the energy reservoir comprising a first end connected to the traveling member at a third pivot point, and a second end connected to the second end of the variable member at a fourth pivot point;
  a linkage mounted to the variable member and having a first attachment point;
  an arresting mechanism connected to the frame, the arresting mechanism having first and second opposite ends separated by a plurality of arresting positions; and
  a carriage, the carriage stores one or more objects comprising a load, a single connection comprised between the load point of the traveling member and the carriage, and the single connection between the load point of the traveling member and the carriage being the only connection between the carriage and all other components of the force engine;
  wherein the force engine comprises an adjusting mode and an operating mode;
  the adjusting mode defined by:
    the first attachment point of the linkage connected to the traveling member;
    the third pivot point of the energy reservoir unaligned with the second pivot point of the variable member;
    the second ends of the variable member and the energy reservoir disconnected from the plurality of arresting positions such that the variable member is rotatable about the second pivot point and the energy reservoir is rotatable about the third pivot point; and
    a change in the load of the carriage is applied to the load point of the traveling member to rotate the second end of the traveling member about the first pivot point, rotation of the second end of the traveling member imparts rotation of the second end of the variable member via the linkage, corresponding rotation of the second end of the energy reservoir with the rotation of the second end of the variable member, thereby adjusting the force engine to the change in the load by using the load applied to the traveling member to rotate the second ends of the variable member and the energy reservoir;
  and the operating mode defined by:
    the first attachment point of the linkage disconnected from the traveling member;
    the second ends of the variable member and the energy reservoir fixed at one of the plurality of arresting positions; and
    the energy reservoir applies force to the traveling member at the third pivot point, thereby rotating the second end of the traveling member and moving the load point to drive the carriage with minimal user input.

* * * * *

UNITED STATES PATENT AND TRADEMARK OFFICE
CERTIFICATE OF CORRECTION

PATENT NO. : 9,903,526 B2  
APPLICATION NO. : 13/098155  
DATED : February 27, 2018  
INVENTOR(S) : Roberts et al.

Page 1 of 1

It is certified that error appears in the above-identified patent and that said Letters Patent is hereby corrected as shown below:

On the Title Page

Item (73) Assignee, change "West Des Moines, IA (US)" to --Frisco, TX (US)--

Signed and Sealed this  
Twenty-sixth Day of February, 2019

Andrei Iancu  
*Director of the United States Patent and Trademark Office*